United States Patent
Sie et al.

(10) Patent No.: US 7,818,763 B2
(45) Date of Patent: Oct. 19, 2010

(54) VIDEO ADVERTISING

(75) Inventors: John J. Sie, Englewood, CO (US); John C. Beyler, Highlands Ranch, CO (US); Gregory R. DePrez, Highlands Ranch, CO (US)

(73) Assignee: Starz Entertainment, LLC, Englewood, CO (US)

( * ) Notice: Subject to any disclaimer, the term of this patent is extended or adjusted under 35 U.S.C. 154(b) by 1566 days.

(21) Appl. No.: 10/460,753

(22) Filed: Jun. 11, 2003

(65) Prior Publication Data

US 2004/0030599 A1 Feb. 12, 2004

Related U.S. Application Data

(60) Provisional application No. 60/391,723, filed on Jun. 25, 2002.

(51) Int. Cl.
*H04N 7/10* (2006.01)
(52) U.S. Cl. .................. 725/32; 705/14.68; 705/14.69; 386/6; 386/68
(58) Field of Classification Search ................ 725/23, 725/32, 34–36; 705/14.68, 14.69; 386/6, 386/68
See application file for complete search history.

(56) References Cited

U.S. PATENT DOCUMENTS

| | | | |
|---|---|---|---|
| 5,485,221 A | 1/1996 | Banker et al. | |
| 5,610,653 A | 3/1997 | Abecassis | |
| 5,619,249 A | 4/1997 | Billock et al. | |
| 5,684,918 A | 11/1997 | Abecassis | |
| 5,805,154 A | 9/1998 | Brown | |
| 5,850,218 A | 12/1998 | LaJoie et al. | |
| 5,945,988 A | 8/1999 | Williams et al. | |
| 5,977,964 A | 11/1999 | Williams et al. | |

(Continued)

FOREIGN PATENT DOCUMENTS

WO　WO 00/59220 A1　10/2000

(Continued)

OTHER PUBLICATIONS

Leibowitz, Dennis H. "Interactive TV: Turning Couch Potatoes into Mouse Potatoes" Law & Finance section of Cable TV and New Media, Apr. 2000, 6 pages, vol. 18, No. 1, Media Law Publishing Corp.

(Continued)

*Primary Examiner*—Brian T Pendleton
*Assistant Examiner*—Nnenna N Ekpo
(74) *Attorney, Agent, or Firm*—Townsend and Townsend and Crew LLP

(57) ABSTRACT

According to the invention, a method is disclosed for playing a video program for a user that has an associated commercial that can be avoided to some extent if the user is authorized. In one step, the video program is received with the associated commercial and made available for display. An attempt by the user to avoid normal playback is detected. A playback point in the video program for the associated commercial is determined. The attempt is correlated to the playback point in the video program for the associated commercial. It is determined whether the user is authorized to avoid normal playback of the associated commercial. If the user is not authorized to avoid normal playback of the associated commercial, the attempt is thwarted.

17 Claims, 32 Drawing Sheets

U.S. PATENT DOCUMENTS

| | | | |
|---|---|---|---|
| 5,995,134 | A | 11/1999 | Hayashi |
| 6,005,561 | A | 12/1999 | Hawkins et al. |
| 6,049,333 | A | 4/2000 | LaJoie et al. |
| 6,163,272 | A | 12/2000 | Goode et al. |
| 6,163,316 | A | 12/2000 | Killian |
| 6,177,931 | B1 | 1/2001 | Alexander et al. |
| 6,188,398 | B1 | 2/2001 | Collins-Rector et al. |
| 6,253,375 | B1 | 6/2001 | Gordon et al. |
| 6,314,572 | B1 | 11/2001 | LaRocca et al. |
| 6,314,573 | B1 | 11/2001 | Gordon et al. |
| 6,314,575 | B1 | 11/2001 | Billock et al. |
| 6,324,338 | B1 | 11/2001 | Wood et al. |
| 6,486,892 | B1 | 11/2002 | Stern |
| 6,571,390 | B1 | 5/2003 | Dunn et al. |
| 6,588,015 | B1 * | 7/2003 | Eyer et al. .................... 725/89 |
| 6,637,029 | B1 | 10/2003 | Maissel et al. |
| 6,725,303 | B1 | 4/2004 | Hoguta et al. |
| 6,813,775 | B1 | 11/2004 | Finseth et al. |
| 7,197,758 | B1 * | 3/2007 | Blackketter et al. .......... 725/37 |
| 7,546,617 | B1 * | 6/2009 | Kienzle et al. ............... 725/23 |
| 2002/0026459 | A1 | 2/2002 | Fernandez |
| 2002/0077880 | A1 | 6/2002 | Gordon et al. |
| 2002/0120498 | A1 | 8/2002 | Gordon et al. |
| 2002/0144262 | A1 * | 10/2002 | Plotnick et al. ............... 725/32 |
| 2002/0178443 | A1 * | 11/2002 | Ishii ............................. 725/22 |
| 2003/0020744 | A1 | 1/2003 | Ellis et al. |
| 2003/0058707 | A1 * | 3/2003 | Dilger et al. ................ 365/200 |
| 2003/0061610 | A1 | 3/2003 | Errico |
| 2003/0067554 | A1 | 4/2003 | Klarfeld et al. |
| 2003/0070167 | A1 * | 4/2003 | Holtz et al. .................... 725/32 |
| 2003/0088872 | A1 | 5/2003 | Maissel et al. |
| 2003/0101451 | A1 | 5/2003 | Bentolila et al. |
| 2003/0172376 | A1 * | 9/2003 | Coffin, III .................... 725/22 |
| 2003/0208756 | A1 * | 11/2003 | Macrae et al. ................ 725/34 |
| 2004/0117831 | A1 | 6/2004 | Ellis et al. |
| 2005/0076359 | A1 * | 4/2005 | Pierson et al. ................ 725/32 |
| 2005/0204385 | A1 * | 9/2005 | Sull et al. ..................... 725/45 |
| 2006/0015893 | A1 * | 1/2006 | Kitsukawa et al. ........... 725/23 |
| 2007/0067800 | A1 * | 3/2007 | Wachtfogel et al. .......... 725/42 |
| 2007/0089141 | A1 * | 4/2007 | Gordon et al. ................ 725/61 |
| 2007/0130595 | A1 * | 6/2007 | McElhatten et al. .......... 725/88 |
| 2008/0282285 | A1 * | 11/2008 | Thomas et al. ................ 725/32 |

FOREIGN PATENT DOCUMENTS

| | | | |
|---|---|---|---|
| WO | WO 00/79798 | A1 | 12/2000 |

OTHER PUBLICATIONS

Broadband Week.com website printout entitled, "Join over 23,000 key decision-makers in the broadband market every business day . . ." Broadband Week, at http://www.broadbandweek.com/news/020603/print/020603_content_one.htm, Jun. 3, 2002; 3 pages.

* cited by examiner

VIDEO ADVERTISING

This application claims the benefit of and is a non-provisional of U.S. Provisional Application Ser. No. 60/391,723 filed on Jun. 25, 2002, which is incorporated by reference in its entirety.

This application is related to U.S. patent application Ser. No. 10/460,770, filed Jun. 11, 2003, entitled "Cross-Channel Interstitial Program Promotion", which is incorporated by reference in its entirety.

BACKGROUND OF THE INVENTION

This invention relates in general to content delivery and, more specifically, to delivering a video program with advertising.

The advertising industry is in turmoil about commercial skipping in advertising supported video programming. Technologies are available to allow automatic skipping of commercials during playback on a digital video recorder (DVR) or a video cassette recorder (VCR). No longer can an advertiser assume that watching a program by a consumer will result in playback of the commercials embedded in that program. Some have suggested that product placement will assume a larger role in advertising or that other advertising mediums should be used.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set for in the appended claims.

Figure 1A:
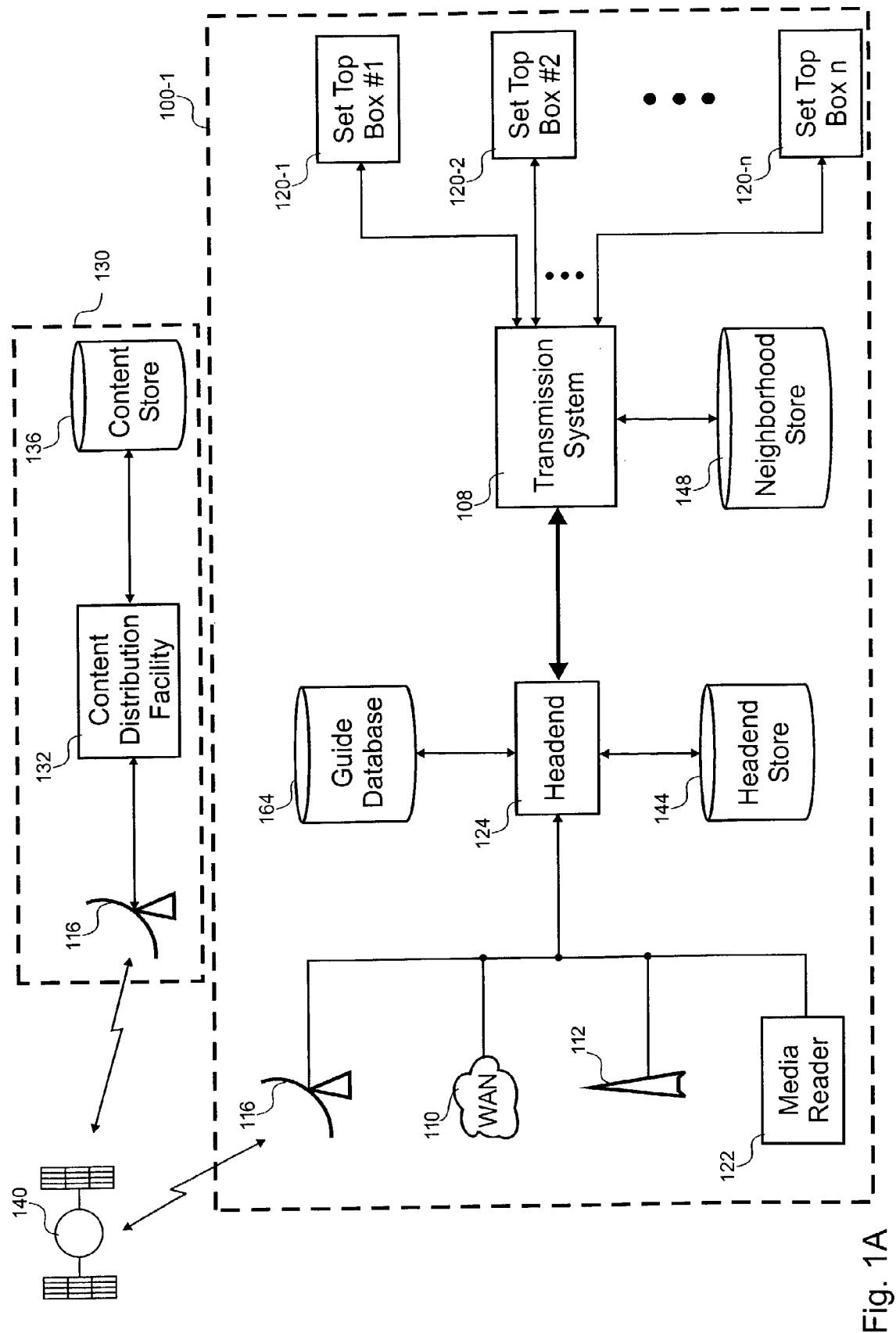
FIG. 1A is a block diagram that shows an embodiment of a program delivery system in satellite communication with a content provider.

Referring first to FIG. 1A, a block diagram is shown of an embodiment of a program delivery system 100-1 in satellite communication with a content provider 130. This embodiment only depicts one content provider 130, but typically there are many content providers 130. The program delivery system 100-1 takes the content and delivers it to set top boxes 120. The users with the set top boxes are billed by the program delivery system 100-1 in a variety of ways.

The depicted content provider 130 communicates via a satellite 140 with the program delivery system 100-1. Other embodiments could have content providers 130 that could also use a wide area network 110, a terrestrial antenna 112, a media reader 122, and/or other distribution techniques. The wide area network 110 could be a private or public network. Distribution on a public network, such as the Internet, could be protected by encryption and/or virtual private network (VPN) techniques. The terrestrial antennae 112 could accept content broadcast by local stations, sent by microwave link, or other wireless techniques. Any type of portable media could be read by various embodiments of the media reader 122. For example, a media reader could input content from magnetic tape, film, optical disk, flash drives, hard drives, magnetic disks, holographic media, etc.

This embodiment of the content provider 130 includes a satellite dish 116, a content distribution facility 132 and a content store 136. The satellite dish 116 is used to connect via the satellite 140 to another satellite dish of the program delivery system 100-1. Some embodiments could have a number of program delivery systems 100 that communicate with the content provider 130 to receive programs for geographically disparate set top boxes 120. The content store 136 is used to hold programs on tapes, optical drives, magnetic drives, and/or other storage mediums. The content distribution facility 132 retrieves, edits, formats, and transmits the content. Program guide information, program schedule, promotional audio and/or video is also forwarded by the content distribution facility 132 and stored in a guide database 164 for use in populating navigation menus.

The program delivery system 100-1 delivers the programs from various content providers 130 to the set top boxes 120 of the users. Many different topologies are used to deliver the programs. A transmission system is a mix of fiber, coaxial cable, microwave datalink, and/or VDSL that is used to distribute the content to set top boxes 120. Neighborhood nodes or hubs could be included in the transmission system 108.

Some programs are relayed in real-time, while others are stored in a headend store 144 for later delivery. For example, a local network channel could be received on the terrestrial antennae 112 and coupled to the transmission system 108 for immediate delivery to the set top boxes according to a linear schedule. Some programs could be held in the headend store 144 for viewing in a linear schedule or on demand. In some cases, programs could be distributed to a neighborhood store 148 for distribution according to a linear schedule or on demand.

A number of neighborhood stores 148 could be distributed to neighborhood nodes in a larger metropolitan area such that there are sufficient singlecast channels between each store 148 and cluster of set top boxes 120. On a singlecast channel, the user can control playback of a content residing on the neighborhood store 148. The programs could be video on demand (VOD), subscription video on demand (SVOD) or programs from the linear schedule recorded for the user.

The guide database 164 has program descriptions, ratings, advertisements, schedule times, pricing, usage limits and promotional video and/or audio for the content available to the program delivery system 100-1. The guide database 164 could be populated by the content provider and/or a third party that gathers this type of information. Some embodiments could download relevant portions of the guide database 164 to each set top box 120 for browsing. Also, a web site could show this information in addition to making it available through the set top box 120. Programs could be selected for recording and subscriptions could be ordered through the web site. One embodiment could formulate the guide screens with information from the guide database 164 for singlecast to a particular user or set top box 120.

Figure 1B:
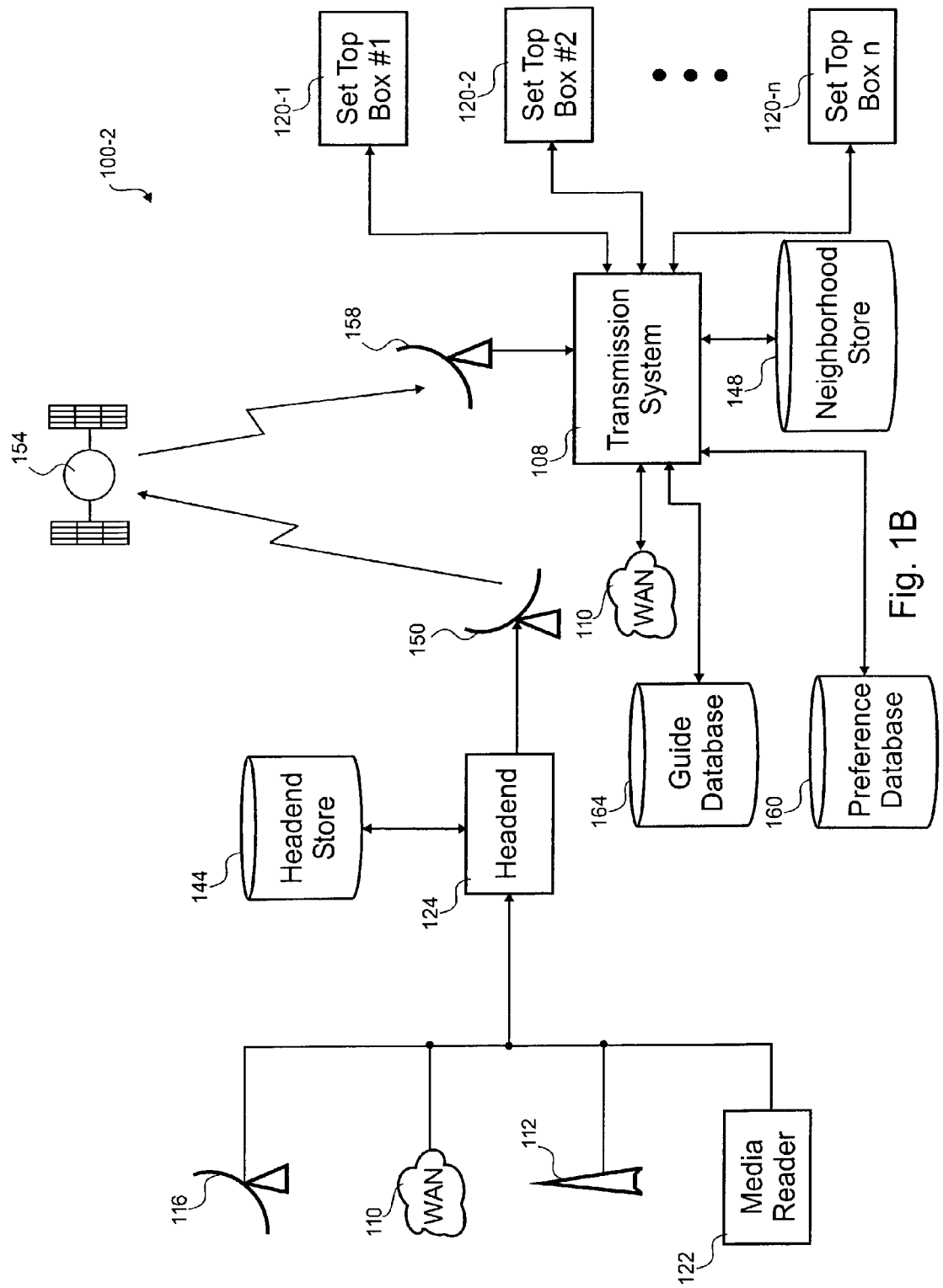
FIG. 1B is a block diagram that shows another embodiment of a program delivery system using satellite transmission to a group of set top boxes.

With reference to FIG. 1B, a block diagram that shows another embodiment of a program delivery system 100-2 using satellite transmission to a group of set top boxes 120 is shown. This embodiment uses a transmission system 108 that receives content from the headend 124 by way of a satellite 154. The guide database 164 is updated through the WAN 110 and/or a satellite data channel. Some or all programs reside on a neighborhood store 148. The guide database 164 is used to provide guide information screens that are singlecasted to a particular set top box 120. At the set top box 120, manipulations of the displayed information are relayed back to the neighborhood node in order to change the singlecasted menus and content stream.

The presentation of information from the set top box 120 can be customized for particular set top boxes 120, households and/or users. A preference database 160 stores customization parameters to facilitate the personalization of the set top box interface. The personalization can be per user, household or set top box 120 under the direction of the user. Information such as viewing habits, preferences, menu customizations, favorite shows, programs scheduled for recording, channel nicknames, parental controls, etc., can be stored in the preference database 160 for use by the transmission system 108. For example, the transmission system 108 can customize the menus singlecasted to a user based upon information in the preference database 160. The preference information can be passively gathered by tracking users and/or actively gathered by the user answering questions.

The transmission system 108 could communicate with the set top boxes 120 using a variety of media. Some embodiments could use ethernet, optical fiber, coaxial cable, carrier current data transport, and/or VDSL. The set top box 120 for the various media would have a port capable of interfacing to the particular media. Embodiments could use more than one media. For example, VDSL could be used to bring one or more channels to the user location, but distribution within the user location could use carrier-current networking through the power lines to other set top boxes 120 in the user location.

Figure 1C:
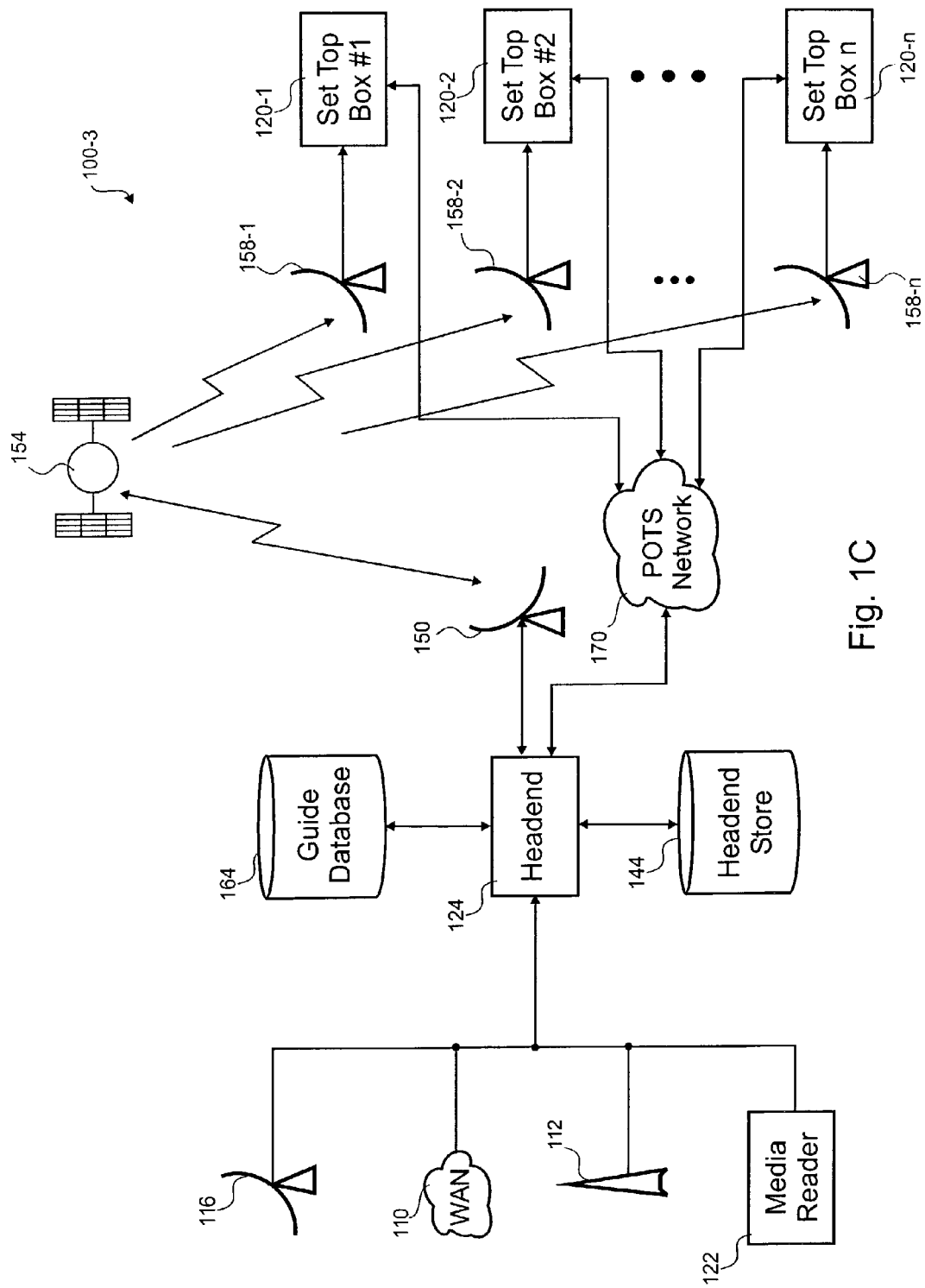
FIG. 1C is a block diagram that shows another embodiment of a program delivery system using satellite transmission to each set top box.

Referring next to FIG. 1C, a block diagram that shows another embodiment of a program delivery system 100-3 using satellite transmission to each set top box 120. The content is relayed by satellite 154 to a satellite receiver 158 coupled to each set top box 120. This embodiment has a return data channel through the plain old telephone system (POTS), but other embodiments could use a WAN, the Internet, a satellite uplink, a wireless network, etc. Each set top box 120 in this embodiment includes a guide database 164, preference database 160 and store for programs.

Figure 1D:
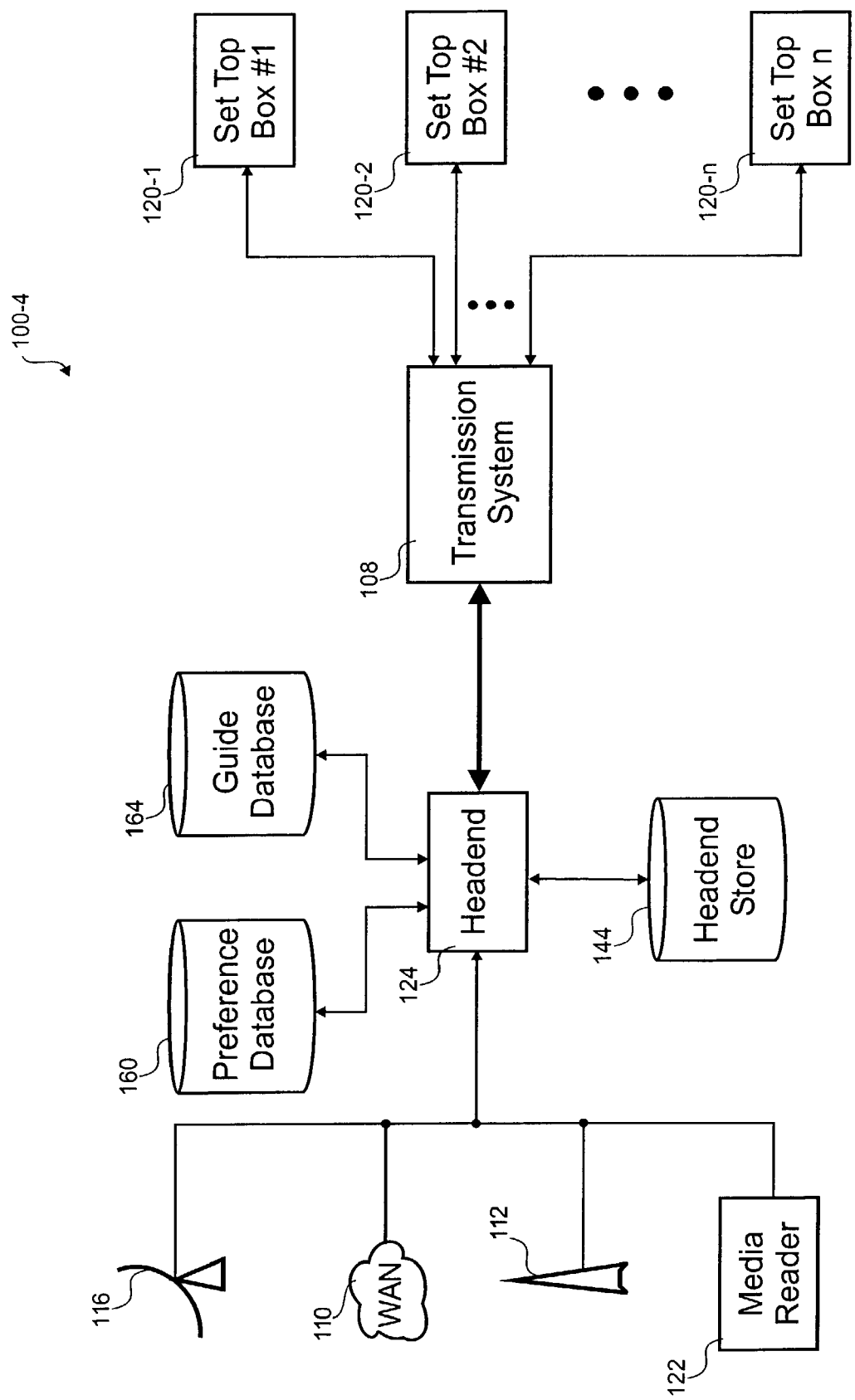
FIG. 1D is a block diagram that shows another embodiment of a program delivery system having user customization and programs stored in the headend.

With reference to FIG. 1D, a block diagram that shows another embodiment of a program delivery system 100-4 having user customization and programs stored at the headend 124 is shown. This embodiment singlecasts menu screens and at least some programs from the headend 124 to individual set top boxes 120. The specific topology could be fiber from the headend to a user location or neighborhood node. Programs are sent in a linear schedule or with VOD control. Those programs with VOD control are recorded in the headend store 144. A user can specify programs from the linear schedule to be held in the headend store 144 for the benefit of that user and perhaps, other users also. The preference database 160 and guide database 164 are maintained at the headend for the benefit of the user. Interaction by the user with the set top box 120 is relayed back to the headend such that the menus and playback is controlled.

Although some of the embodiments discuss a set top box separate from a television display, it is to be understood other embodiments could include the set top box functionality as part of another component. For example, the set top box could be integrated into the television set, digital video recorder, DVD recorder, or other audio/visual equipment.

Figure 2A:
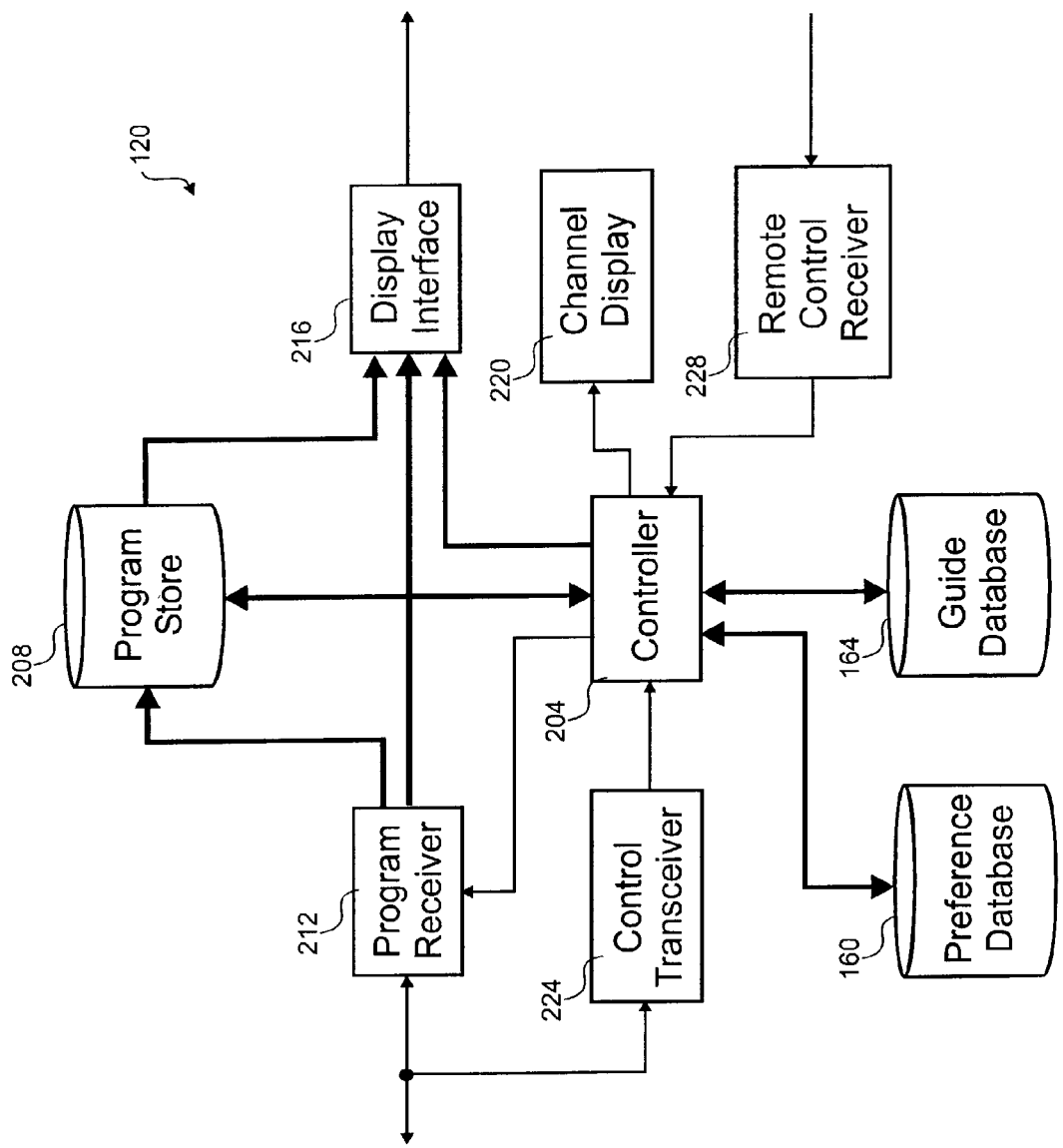
FIG. 2A is a block diagram illustrating an embodiment of a set top box that stores programs, guide information and preferences locally.

Referring next to FIG. 2A, a block diagram illustrating an embodiment of a set top box 120 that stores guide information, programs and preferences locally is shown. This embodiment receives content and control information over a common conduit, such as an optical fiber, VDSL line, or coaxial cable. The set top box 120 in this embodiment has a hard drive or other storage medium, such as an optical disk, flash memory, SRAM, removable disk, and/or magnetic tape. Included in the set top box 120 are a controller 204, a program store 208, a program receiver 212, a display interface 216, a channel display 220, a control transceiver 224, the preference database 160, and the guide database 164. The set top box 120 could be combined with other equipment such as a television, a computer, a tuner, a home gateway, a digital music player, a personal video recorder, etc.

The program receiver 212 tunes to one or more program streams to display and/or record them. Recordings are stored in the program store 208. Playback of live or recorded programs is done by the display interface 216, which is coupled to a monitor, plasma panel, projection system, or other display. The remote control receiver 228 receives keystrokes from a remote or other input device. Although some of the embodiments discuss the use of a remote control for activating certain functions, it is to be understood that other embodiments may include alternative methods for activating those functions. For example, voice activation, among other alternatives, may be used for such activation. The channel currently being played is shown on the channel display 220, which could also appear superimposed on the display.

The control transceiver 224 receives and sends control information. Information for the guide database 164 is received by the control transceiver 224 and could be customized by the delivery system 100 for a particular set top box 120. Information in the preference database 160 along with billing and other information is passed by the control receiver to the network node and/or headend 124. Programs could be passed through the control channel for storage in the program store 208 in addition to passing through the more typical path of the program receiver 212.

The program store 208 could be a video cassette recorder, a digital tape recorder, a hard drive, solid state storage, an optical drive, or other known storage mechanisms. The storage media could be removable or non-removable. The storage device could be external to the set top box and coupled thereto with a dedicated cable, wireless transceiver, and/or packet switched network. In some embodiments, the program store 208 could be, for example, in a residential gateway, in another computer on the network, in a network storage device, or in a storage device peripheral coupled to the set top box 120.

Operation of the set top box 120 is managed by the controller 204 with use of supporting software and/or hardware. The guide database 164 and preference database 160 are used by the controller 204 to present menu screens to the users of the set top box 120. Some embodiments of the set top box 120 customize the user interface according to the user(s) interacting with the set top box. Biometric recognition, such as face recognition, voice recognition or keystroke recognition, could be used to determine the user. Alternative embodiments could augment or replace the automatic recognition with a screen prompt or a button on the remote. A button or switch on the remote could be assigned such that each user could indicate his or her presence. Once the identity of the viewer is known, the set top box 120 is actively or passively updates the preferences for the viewer.

Figure 2B:
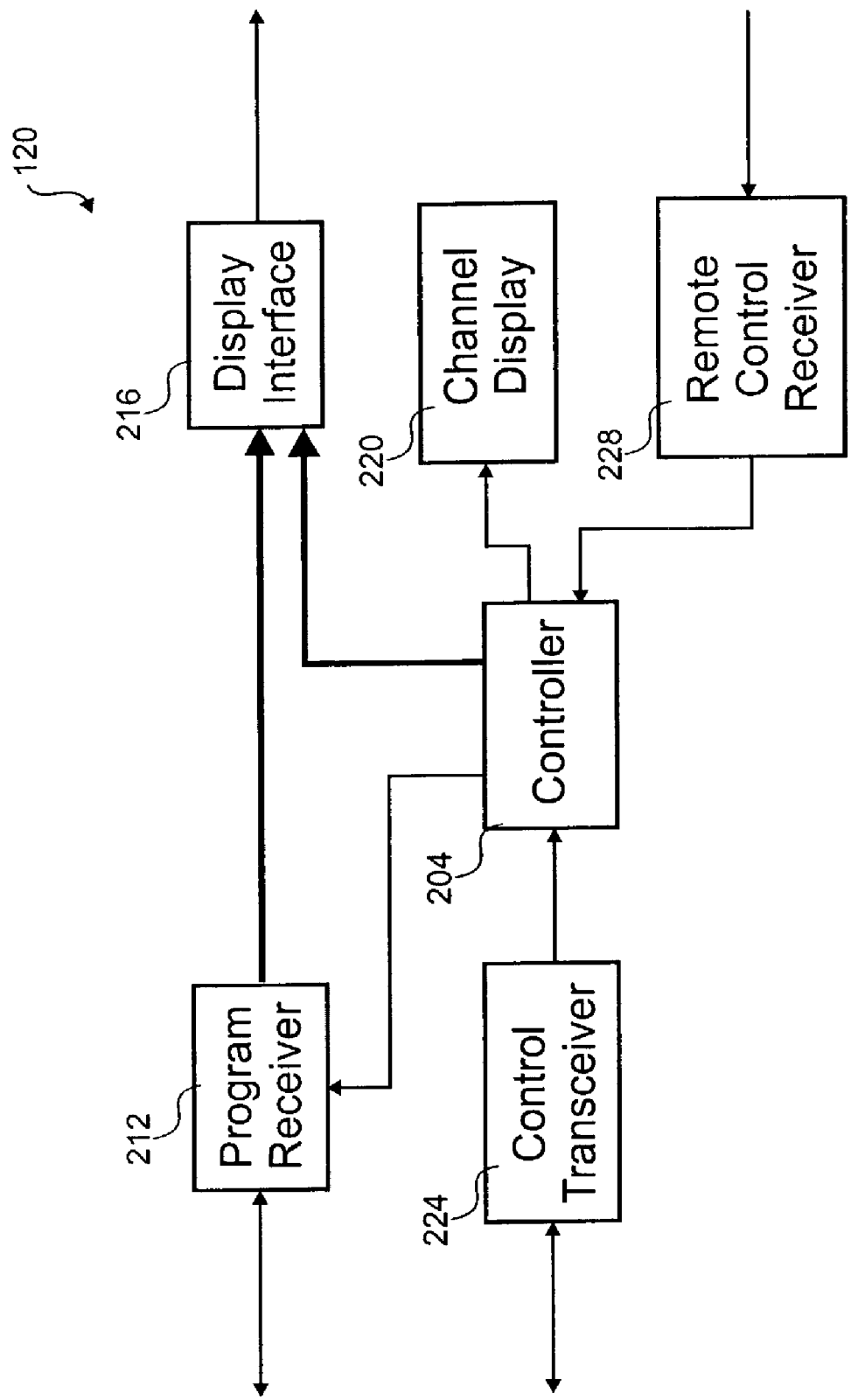
FIG. 2B is a block diagram illustrating an embodiment of a conventional set top box.

With reference to FIG. 2B, a block diagram illustrating an embodiment of a conventional set top box 120 is shown. This embodiment receives linear programs in the conventional manner. Any programs from the linear schedule are recorded in the neighborhood node or the headend 124 for respective storage in a neighborhood store 148 or headend store 144. Those stored programs can be singlecasted to the set top box 120 for later viewing. Similarly, the guide and preference databases 164, 160 are maintained elsewhere, but used when singlecasting the menu information to the set top box 120 for display.

Figure 3:
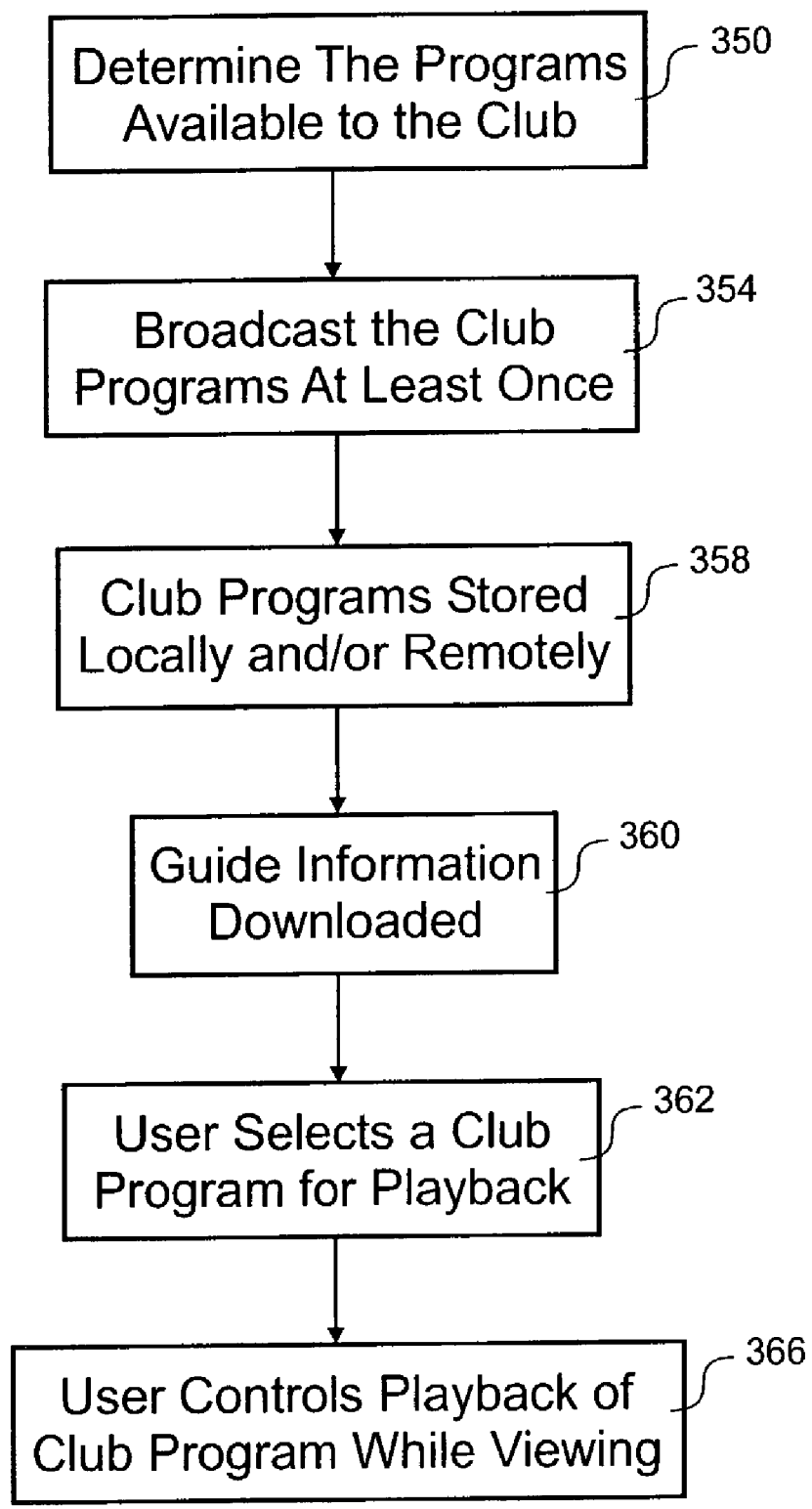
FIG. 3 is a flow diagram that shows a process for pre-storing a club program local to the user.

Referring next to FIG. 3, a flow diagram shows a process for pre-storing a club program at a user location. Club programs are programs that are made available to a club member, such as, a user, user location, set top box, or other grouping of users. In this embodiment, the user location is subscribed to one or more linear premium channels. A package of club programs is offered with VOD control of playback as a benefit. Those club programs, that may or may not require additional compensation, also are scheduled in the linear schedule of those premium channels. Other embodiments could record programs without being tied to a program or could allow recording programs for a fee or some other compensation.

The depicted portion of the process begins in step 350 where a linear schedule is analyzed to determine which programs to offer to the club with local playback control. Typically, the desirable programs are offered as club programs, but any scheme could be used. This embodiment transfers the whole club program to the user location. The club programs are chosen by someone other than the user in this embodiment, for example, the content provider 130 or multi-system operator (MSO). Some embodiments could allow the user to influence the shows that are included as club programs based upon the information in the preference database 160, while other embodiments could allow the user to select programs from the linear schedule to record.

In step 354, the club programs are broadcast to the club members. The broadcast of this embodiment can be done over one or more channels. The broadcast could be part of the linear schedule, at an unannounced time or in a hidden datastream not accessible to the user during download. Typically, a time in the middle of the night or any other time is used for the broadcast or multicast. If the set top box 120 has the capability to tune multiple channels at one time, the speed of download can be increased by downloading a program through multiple channels. Any transport could be used for those program downloads, for example, MPEG or IP. It is to be further understood that other embodiments could use a broadband WAN or Internet connection to download the club programs.

The club programs are stored local or remote to the user location in step 358. The program store 208, the neighborhood store 148 or headend store 144 could hold the club programs in various embodiments. Some embodiments could store a first portion of the club program and download the remainder from a NVOD or broadband network connection when viewing commences.

The guide database 164 includes information on the club programs. It could be that the guide database 164 is updated with information on all possible shows in the linear schedule as well as the club programs on a regular basis. This embodiment downloads information from the guide database 164 for the club programs. Alternatively, a basic set of information could be first downloaded to the guide database 164 as part of a regular schedule. An augmented set of information could be later downloaded to the guide database 164 for the club programs that are recorded.

In step 362, the user selects one of the club programs or other stored programs for playback. The program can be selected from a menu or selected while watching a club program that is also being received in real time from the linear schedule. The menu could be could be customized according to the preferences of the user(s). The set top box 120 retrieves the club program from the program store 208 when the club program is selected for playback.

Playback of the club program can be fully controlled by the user in step 366. For example, the user can command the set top box 120 with the remote control to fast forward, rewind, pause the playback, etc. Use of the club program could be limited in various ways during the month to comply with any contractual requirements of the copyright holder, user specified limits on costs, or parental controls, for example. Additionally, the set top box 120 could automatically erases the club program when a window defined for its use by the content provider has expired (or some other condition has triggered) unless the copyright holder allows other storage arrangements, such as, storage for one month, one year or indefinitely.

When the program store 208 is full or cannot record additional content, older or lower priority recordings could be erased to make room for new items. For example, the program store 208 may have twenty hours available to record. Club programs, limited by the user(s) preferences, could limit the amount recorded each month to 5 hours. After four months, the twenty hours would be occupied. New recordings would write over the oldest recordings. Further, a check for duplicates could be performed before recording a club program again.

Figure 4:
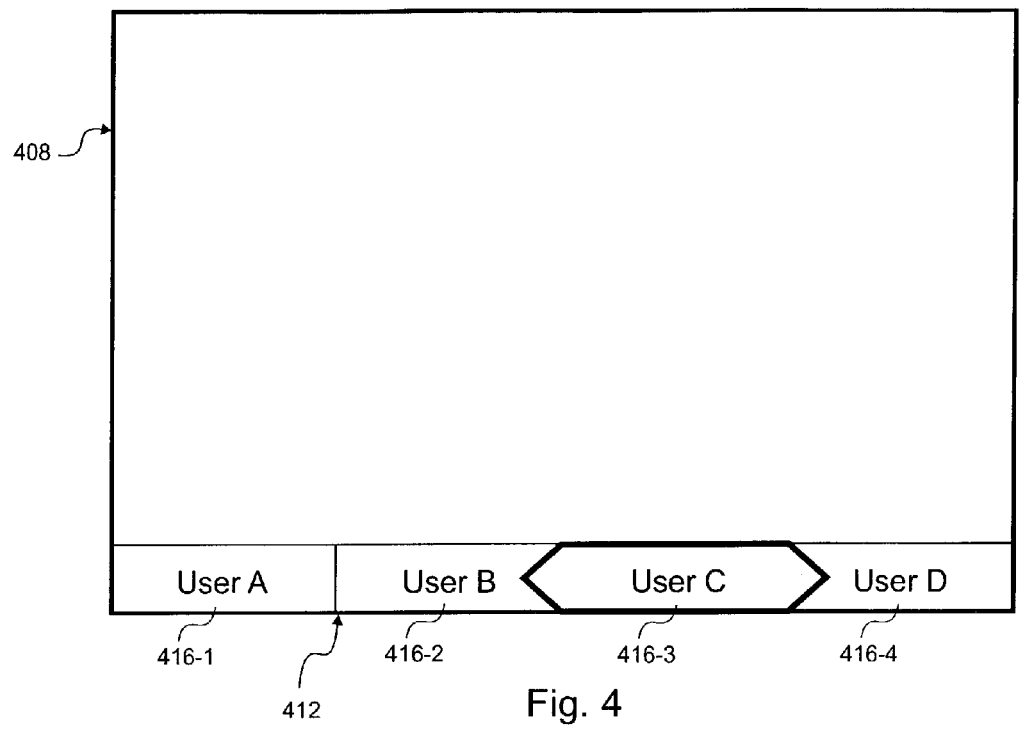
FIG. 4 is a screen shot illustrating an embodiment of a user confirmation footer that shows which user is likely interacting with the set top box.

Referring next to FIG. 4, a rendering of what the user would see on the television screen, i.e., a screen shot 408, illustrating an embodiment of a user confirmation footer 412 is shown that indicates the user that is likely interacting with the set top box 120. In this embodiment, four users 416 have been assigned to this set top box 120. Assignment can be done by the user or automatically. By comparing the content of the current show against historical data and by comparing the frequency and duration of key presses of the remote control against historical data, the set top box 120 determines who is watching the television currently. Other embodiments could use face recognition to detect the user holding the remote or use other biometric techniques. In the depicted example, the determined user is User C, as is indicated by the bolding of the User C indicator 416-3 of the user confirmation footer 412.

The remote control allows the actual user to correct the determined user presented in the user confirmation footer 412. The user can move focus to or highlight the footer 412 and navigate the bolded selection to the actual user that is currently viewing the television. Some embodiments may put a toggle switch on the remote to move bolding right or left with the toggling or may put a wheel knob that also moves bolding right or left. Alternatively, some remote controls may allow assigning a button to various users for selection when that user is currently viewing with the set top box 120. By confirming the actual user, the viewing habits observed by the set top box 120 can be assigned to the proper profile in the preference database 160. Where only one user will normally use the set top box 120, the user confirmation footer 412 could be disabled.

By knowing the user currently viewing the television, the functions of the set top box 120 and content available can be customized for that user according to a profile. The guide menus can be customized for the types of content that would appeal to the user. For example, the available SVOD, VOD, linear programs, and stored programs can be sorted according to those that would likely appeal to the user. For example, a sports fan would be presented with sporting events before children's shows. In some cases, the SVOD programs made available from content providers could be affected by the profile of the user. Further, each user could customize the menu colors, sounds, channels, parental control, etc. in their profile such that recognition of the user would activate these customizations. In some embodiments of the set top box 120 with local storage, the unused storage could be used to record programs that are likely to appeal to the user based upon their profile so long as all the tuners are not being used at the time. Alternatively, the program could be downloaded using a computer network, such as, DOCSIS or packet-switched protocols.

In order to use some user profiles, a password could be used to avoid unauthorized access to that configuration to implement a form of parental control. For example, some profiles could allow access to adult content while others would not have that access. The set top box 120 could determine the likely user, but not enable access to the adult content without a password or other authentication of identity. While viewing the content under parental control, the set top box 120 could later determine that the viewing user had changed to someone without the authorization to view the content. The password could be requested to continue watching.

Figure 5:
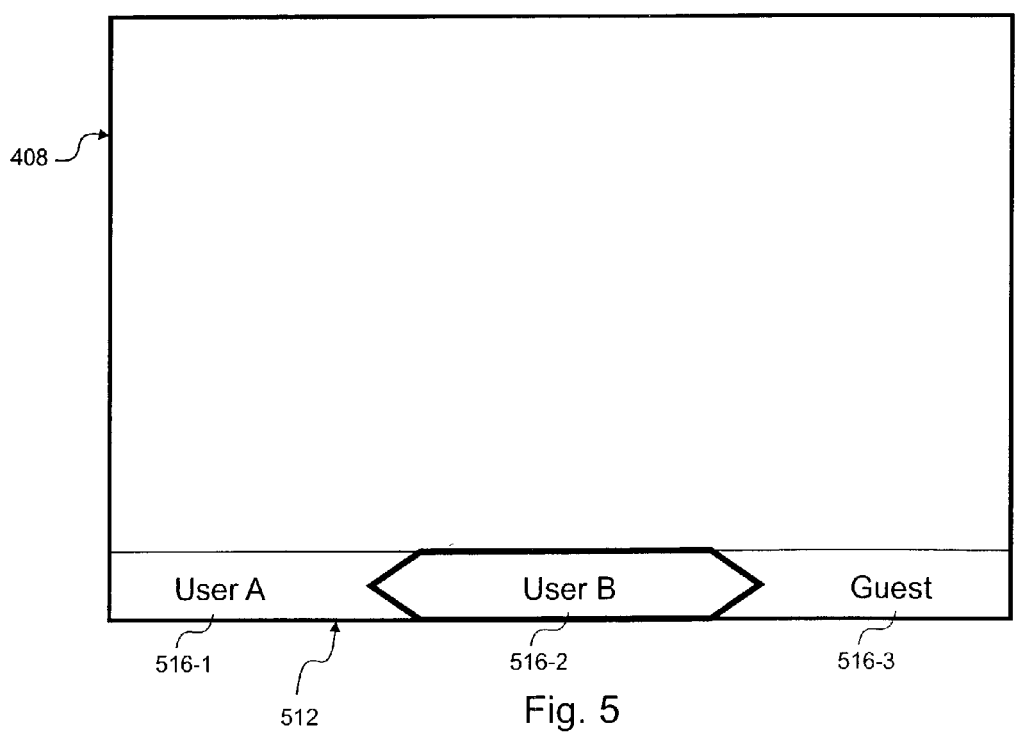
FIG. 5 is a screen shot illustrating another embodiment of a user confirmation footer that shows which user is currently interacting with the set top box.

With reference to FIG. 5, a screen shot 408 illustrating another embodiment of a user confirmation footer 512 is shown that indicates which user is currently interacting with the set top box 120. This embodiment has two users configured to have profiles of their viewing habits recorded. Where no data should be attributed to a particular profile, a "guest" user 516-3 is provided. Where a user that does not have a profile uses the set top box 120, the guest profile can keep the viewing habits of the guest from diluting any particular profile in the preference database 160.

There may be other reasons to use the guest profile beyond when a guest is using the set top box 120. Anytime tracking of a user's viewing habits is ill advised, the guest profile can be used. In this embodiment, using the guest profile prevents tracking of the current user's viewing habits such that the preference database 160 is not updated. Some embodiments could record the viewing habits associated with the guest to be used in forming a new profile in the same way as creating a profile for User A 516-1 and User B 516-2. Alternatively, the guest profile could have default values that do not change with viewing habits. While in the guest setting, some embodiments may disable auto-determination of the user currently interacting with the set top box 120.

Figure 6A:
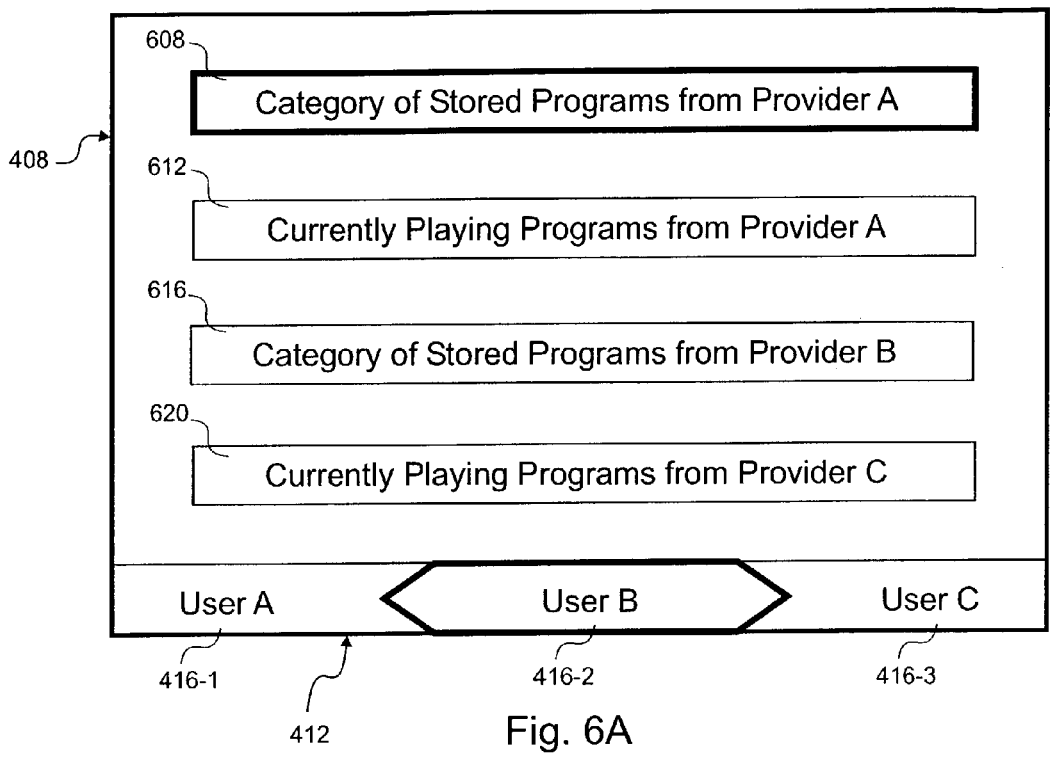
FIGS. 6A and 6B are screen shots illustrating embodiments of an overlay menu cross-promoting other programs in a manner customized for the user.
Figure 6B:
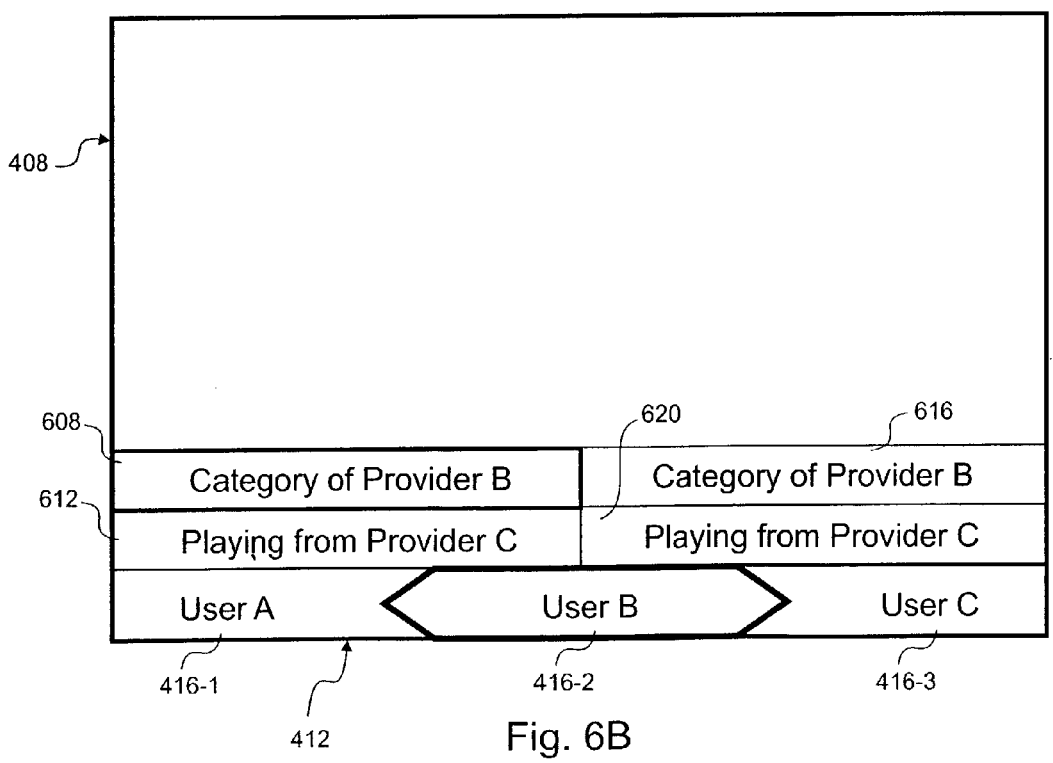

Referring next to FIGS. 6A and 6B, screen shots 408 illustrating embodiments of an overlay menu cross-promoting other programs in a manner customized for the user and/or context is shown. Cross-promotion of other channels occurs in several situations, such as, when a selected program is unauthorized, viewing of a program is complete, paused or stopped; as a temporary overlay when switching channels; in the unused portions of a letterbox or pillar box formatted program; or during the commercial break period. Pillar box format can be used when wide format televisions display a program that is not in wide format such that a blank pillar is shown on both sides of the program. Conversely, letterbox format can be used when a wide format program is shown on a screen that is not wide format such that there is unused screen above and below the program. When channel surfing or cycling through a sequence of channels, an overlay menu 408 could appear over the new channel for a short period of time, such as 2-3 seconds.

The overlay menu could cover the picture or a portion of the picture. The cross-promotion could be for VOD, SVOD or club programs, previously recorded programs, programs playing currently in the linear schedule, or programs in the linear schedule that can be selected for download. The user can customize when the cross-promotion occurs in some embodiments and how long the overlay stays on the screen. Some embodiments could periodically present a cross promotion window over part of the screen during normal viewing. This could be tied to certain events in the program such as an intermission, commercial break, slow point in the drama, etc.

The overlay would eventually disappear unless the user started trying to navigate on the overlay in order to select one of the options. Some embodiments could show the overlay after changing to a new channel, but before the video picture is displayed. For digital video signals it can take a few seconds before a video picture is displayed. Where the channel has no signal or the signal is unauthorized, the overlay menu 408 could remain active until another channel is chosen.

When a user stops viewing content from a particular content provider, other options could be suggested in the overlay menu 408. The confirmation footer 412 could display the determined user and adjust the options available in the overlay menu 408 accordingly. The overlay menu 408 could be transparent or partially transparent. For example, the confirmation footer 412 and the selection buttons 608, 612, 616, 620 could be opaque, while the other portions of the screen show the underlying video. Other embodiments could cover a larger portion of the video or completely cover the video.

The overlay menu 408 could appear in the commercial break for the program. This could appear like any other commercial or share the screen with a commercial. For example, a promo for an upcoming show could have an overlay menu across the bottom allowing a recording to be easily scheduled.

Other breaks, such as no signal being present on a channel, could trigger an overlay menu 408. For example, if the cable signal was missing on a channel, an appropriate message could be shown along with an overlay menu, cross-promoting other content. The signal could be missing due to a temporary interruption or because the channel is unassigned. Alternatively, for channels that stop broadcasting at times or put up a test screen, an overlay menu 408 could also be used.

In some cases, a video program is tunable, but that tuning is prevented for some reason. An overlay menu 408 could be shown in these circumstances also. For example, there may be limits on viewing a program or channel, such as, only five viewings of a particular program or category of programs being allowed or only twenty hours of viewing a channel or group of channels. Further, a user may not be entitled to view a particular program. The lack of entitlement could come from the user not being subscribed or parental control mechanisms.

This embodiment includes four "soft" buttons 608, 612, 616, 620 on the screen 408 for selecting alternative content. Each button 608, 612, 616, 620 potentially corresponds to a group of programs. The buttons displayed and the programs grouped with the button could be culled by the information in the preference database 160 for User B 416-2. The number of buttons displayed could be more or less than four depending on how many categories are available and likely to be chosen by the user. FIG. 6A places the buttons in a manner to cover a larger portion of the screen 408, while FIG. 6B groups the buttons near the bottom of the screen to obscure less of the underlying program. Some embodiments could shrink the height of the underlying video to allow for the buttons 608, 612, 616, 620 and any user confirmation footer 412 without clipping the video.

There are four categories 608, 612, 616, 620 to select in this embodiment. The first category 608 includes recorded programs from Provider A. In the second category 612 are programs playing in the linear schedule for Provider A. Recorded programs from Provider B are in the third category 616. The last category 620 has programs of Provider C that are playing in the linear schedule. The group of programs corresponding to each button 608, 612, 616, 620 could have any common feature that defines the group, such as, linear or stored program, content provider identity, genre, time period in which the programs were stored (e.g., recorded today, this week, this month, etc), type of show (e.g., movie, mini-series, sitcom, etc.), description including a search term, etc. The possible common feature can be predefined or defined by the user.

Figure 7A:
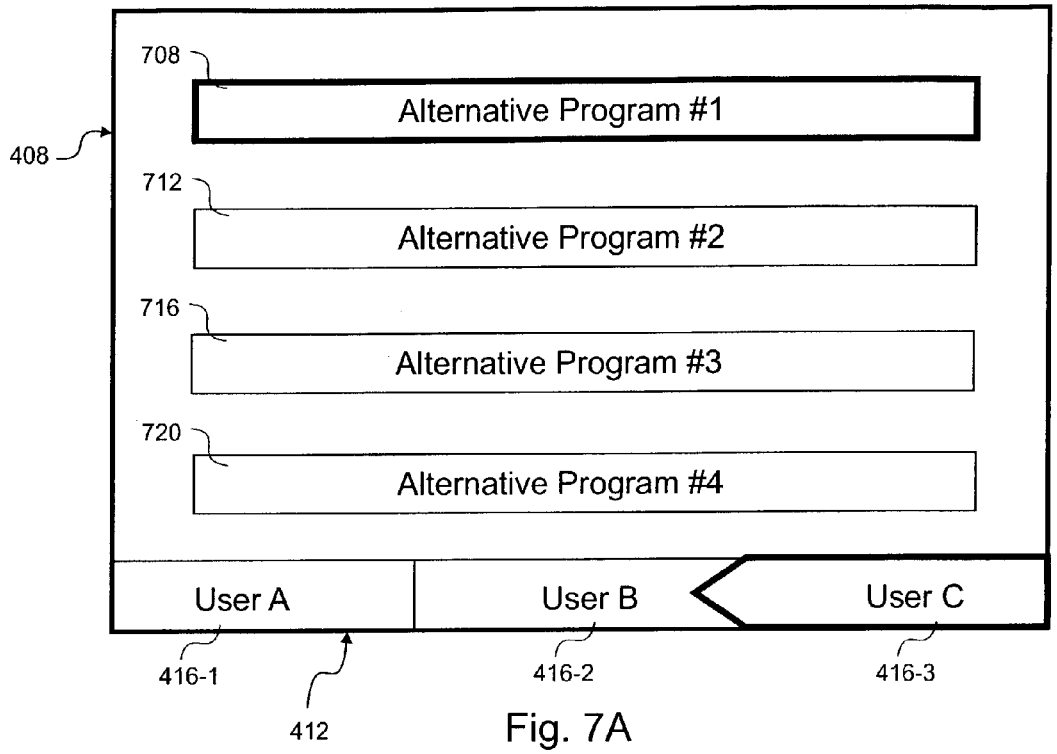
FIGS. 7A and 7B are screen shots illustrating embodiments of an overlay menu cross-promoting other programs customized for the user.
Figure 7B:
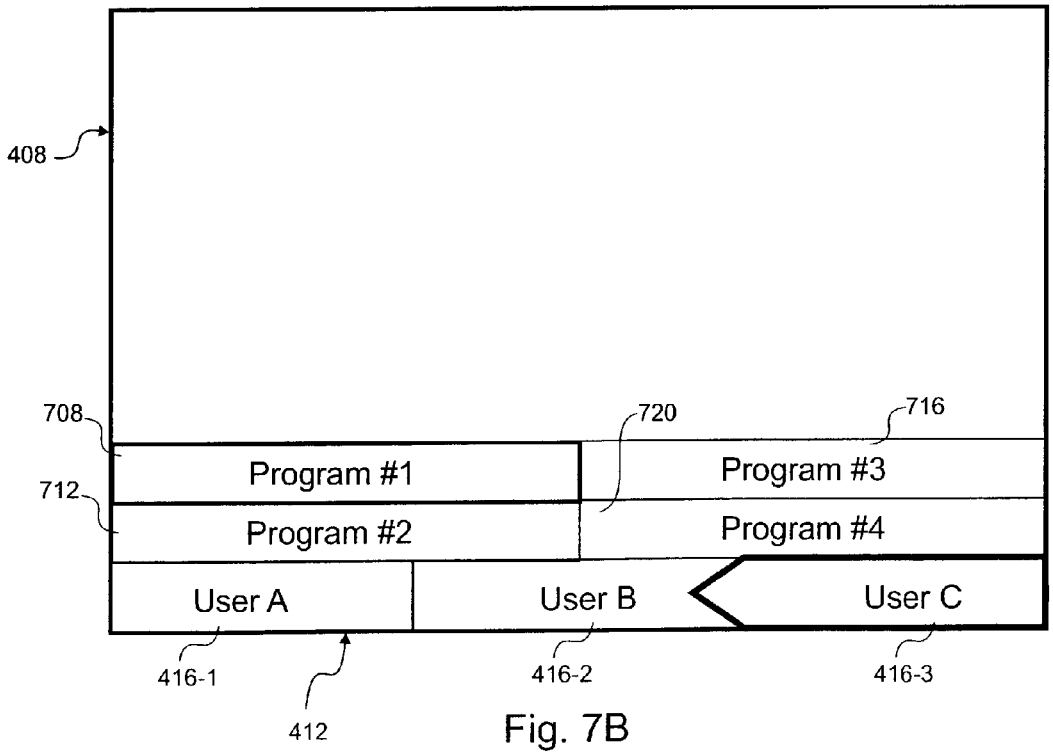

With reference to FIGS. 7A and 7B, screen shots 408 illustrating embodiments of an overlay menu cross-promoting other programs customized for the user are shown. This embodiment shows a variable number of alternative program selectable by a corresponding button 708, 712, 716, 720. The list of programs is customized for User C 416-2 in this embodiment as indicated on user confirmation footer 412. The alternative programs could be limited to a particular content provider or group of providers. The content provider could the same as program just viewed when the overlay menu 408 is triggered by exiting the viewing of a program. Where the overlay menu 408 is triggered by changing to a channel, the program selections could be for SVOD, VOD or linear programs associated with the content provider for that channel.

Figure 8A:
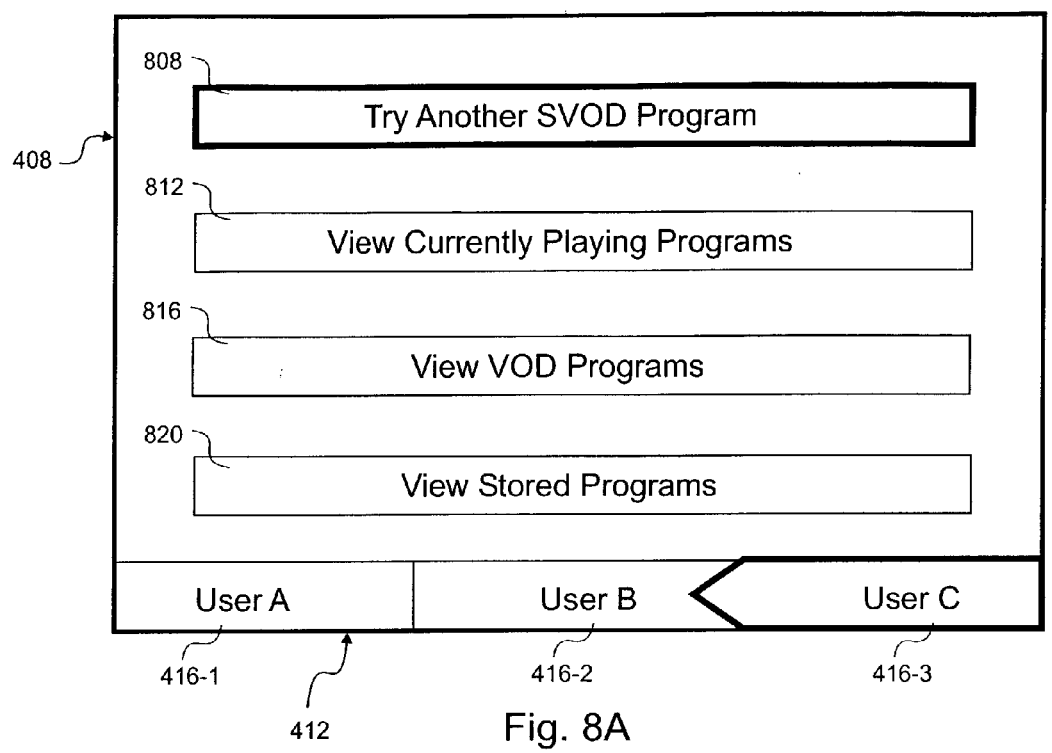
FIGS. 8A and 8B are screen shots illustrating embodiments of an overlay menu cross-promoting other programs in a manner customized for the user.
Figure 8B:
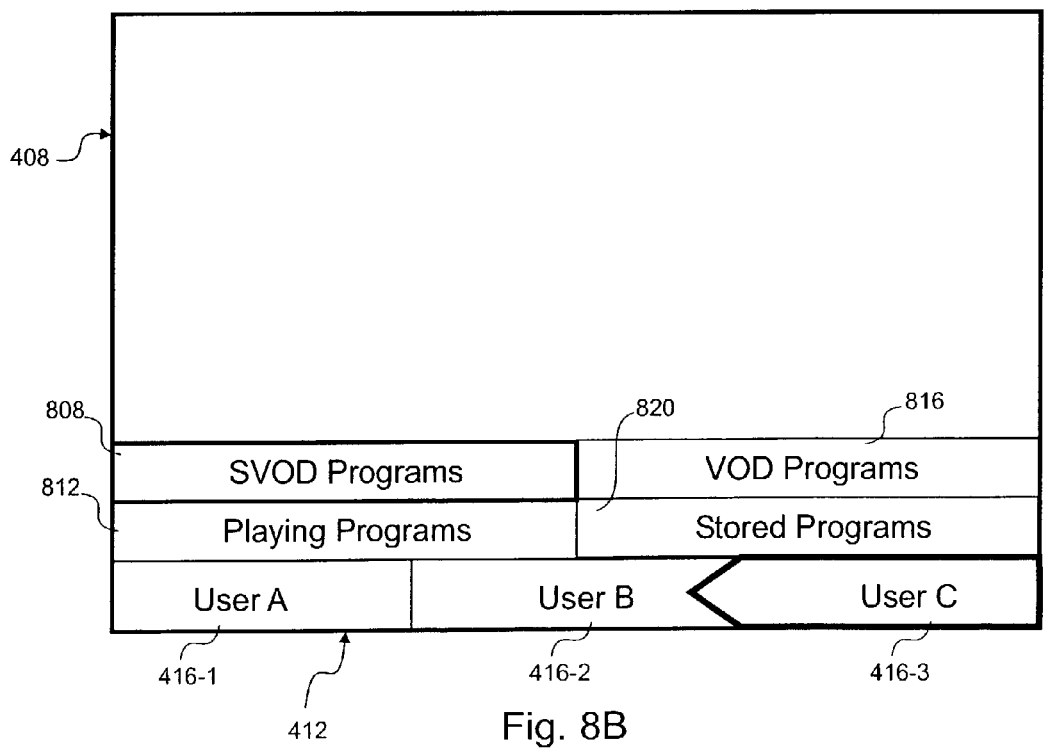

Referring next to FIGS. 8A and 8B, screen shots illustrating embodiments of an overlay menu 408 cross-promoting other programs in a manner customized for User C 416-3 are shown. This embodiment shows categories of programs selectable by button 808, 812, 816, 820. The first button 808 shows the possible SVOD programs the user is authorized to watch. Programs available in the linear schedule are shown when the second button 812 is selected. VOD programs are selectable through the third button 816. The last button 820 allows selecting the recorded programs from the linear schedule. User C 416-3 could customize which buttons are shown on this screen and how many category buttons are included.

Figure 9:
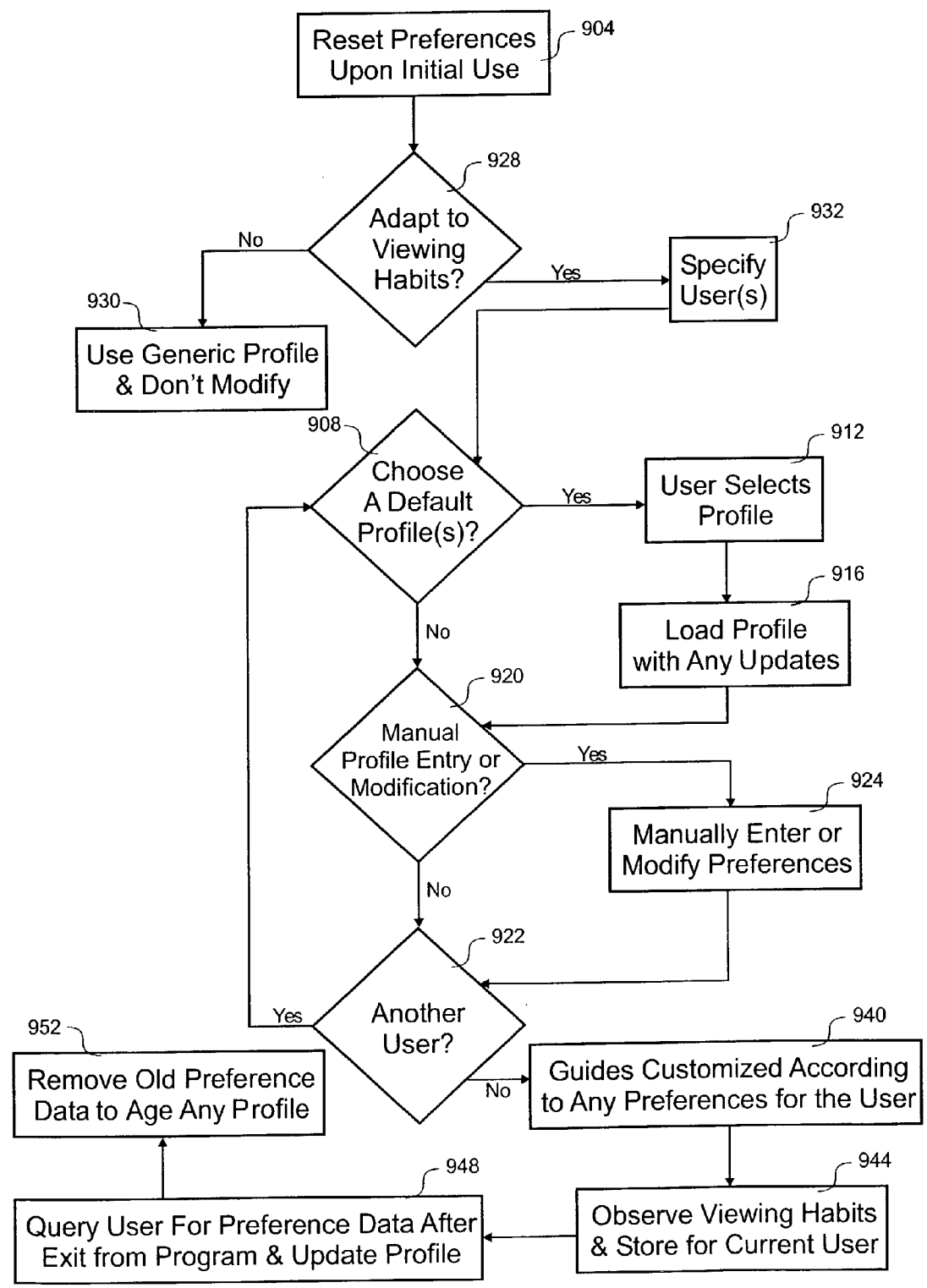
FIG. 9 is a flow diagram illustrating an embodiment of a process for determining preferences for a user.

With reference to FIG. 9, a flow diagram illustrating an embodiment of a process for profiling a user for customization of the set top box 120 is shown. The depicted portion of the process begins in step 904 where any preferences set at the factory or a prior owner of the set top box 120 can be reset during the initialization process. In step 928, a determination is made by the user on whether to allow the viewing habits of the user to affect a profile for the user. In some cases, the profile could be reported away from the user location. A privacy policy may be presented to the user for authorization before allowing recording of the user's viewing habits and/or reporting this information away from the user location.

Where the user wishes to have the viewing habits adapt the profiles for one or more users, processing continues to step 932 where the users of the set top box 120 are specified. Names can be entered for each user. A guest profile can be specified that will not accumulate any preference information, unless the user wants accumulation for that profile. In some cases of step 928, the user(s) may not want any adaptation to his or her viewing habits such that processing continues to step 930 where a default or generic profile is used without modification based upon viewing habits. The generic profile can be updated periodically to reflect viewing habits of a group of users. For example, screens promoting the popular shows as they are determined could be suggested.

In step 908, the user may choose to apply a prepackaged profile or not. Also, a prepackaged profile can be specified with modifications in step 924. The prepackaged profile can be specified even if tracking of the viewing habits is performed. Over time, a prepackaged profile that tracks viewing habits would slowly become customized. Where a prepackaged profile is used without tracking, the profile would remain static. In step 912, one or more prepackaged classifications and/or categories can be specified to characterize the user. Some of these classifications and/or categories include various genres, top rated content, content based upon age or other demographic information, content found generally popular by other users, content found popular by other similar users, etc. The top rated content could be according to some category or genre or could be selected by a specified critic or organization, for example, only top rated movies or top rated western shows or only movies approved by the motion pictures rating association to have a "G" rating. Once classifications and/or categories are selected, they are retrieved from the local program request database 604 in step 916 and added to the user's preferences.

In step 920, the user can choose to enter more specific profile information. This information can supplement the default profile information or be the only information to initially characterize the user. The specific profile information can augment the profile changes resulting from observing of the viewing habits of the user. The manually entered information can be search terms, favorite shows, channels, and/or a time period to record programs on a specified channel. Also, the manually entered information can include negative terms such as excluding programs containing a search term, actor, genre, channel, and/or time period for a specified channel. For example, the user can specify recording everything on channel ten between eight and ten at night or could prevent recording of any program with John Doe as an actor. Also, the content of any cross-promotion windows could be designated for a particular user.

This embodiment allows defining preference information for each user in a serial fashion, although other embodiments could allow specification of the preference information for each user at each of the above steps. Where there is another user, in step 922, processing loops back to step 908 to allow entry of preference information for another user. Any number of users can have their viewing habits influence their profile, apply a default profile, and enter manual profile information.

Once all users are configured, the guides are customized in step 940 according to preferences that are either entered by the user or derived from the user's viewing habits. Customization can be based upon an aggregate profile for all users (i.e., where only one user is specified) or can be a user-specific profile for that user. Automatically determining the user with the confirmation footer 412 assists in this customization. If the determined user is wrong, the actual user can override the automatic determination. In step 944, the viewing habits for the current user are determined and the profile is updated for that user. After viewing any program, the user can be queried to determine if the program was liked in step 948. This query could be along a sliding and graduated scale, such as one to five, for a program. The user can also indicate which actors were liked, if the genre was liked, if the director or musical score was liked, etc. The answers to these questions influence the profile of the user. In step 952, older viewing habits, preference data and/or survey questions can be aged for deletion after a period of time. For example, information more than a quarter-year old could be deleted or older information could be deleted after the viewing habit data reaches a certain size. The user can specify how long viewing habit data should influence the profile.

Figure 10:
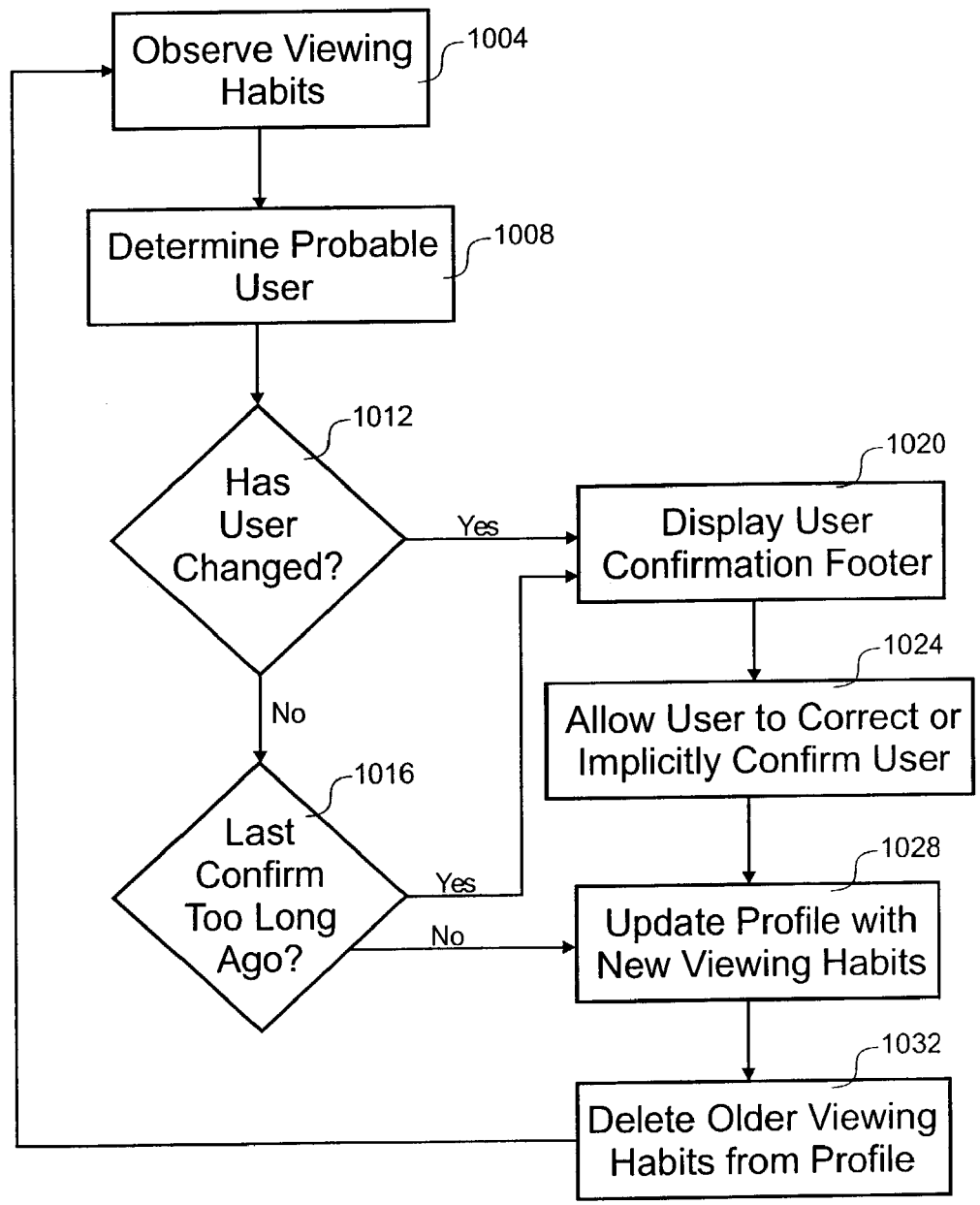
FIG. 10 is a flow diagram illustrating an embodiment of a process for determining and confirming the user currently using the set top box.

Referring next to FIG. 10, a flow diagram illustrating an embodiment of a process for determining and confirming the user currently using the set top box 120 is shown. Where there are multiple users of a set top box 120, identifying the user allows gathering viewing habits for each user separately and presenting guide screens customized for the current user. The depicted portion of the process begins in step 1004 where the set top box 120 observes the viewing habits of the current user. Things such as the programs viewed, the duration of viewing each channel, the timing of interaction with the remote control buttons, time of day, etc. are used to determine the probable identity of the current user in step 1008. Other embodiments could use other biometric techniques.

In step 1012, the set top box 120 determines if the current user has changed. Where the user is believed by the set top box 120 to be a different user, a user confirmation footer 412 is displayed in step 1020. The current user can correct the determined current user in the confirmation footer 412. A correction will adjust the profile for the current user in step 1028 to allow more accurately recognizing that user in the future. In step 1032, the older viewing habits are removed from a user's profile to update a running sample of viewing habits. Some embodiments could also age preference information entered by the user and remove the older preference information along with the older viewing habits.

Where the set top box 120 believes the user is unchanged in step 1012 and the identity of the user has not been confirmed recently as determined in step 1016, processing loops back to step 1020 for display of a user confirmation footer 412. Where the user has confirmed their identity recently, processing continues to step 1028. For example, the user confirmation footer 412 could be displayed if the user has not confirmed their identity this week. Other embodiments could use other time periods. The time period could be measured with a calendar or could be measured in hours of interaction by the user with the set top box 120. The user can specify how often identity can be questioned.

Figure 11:
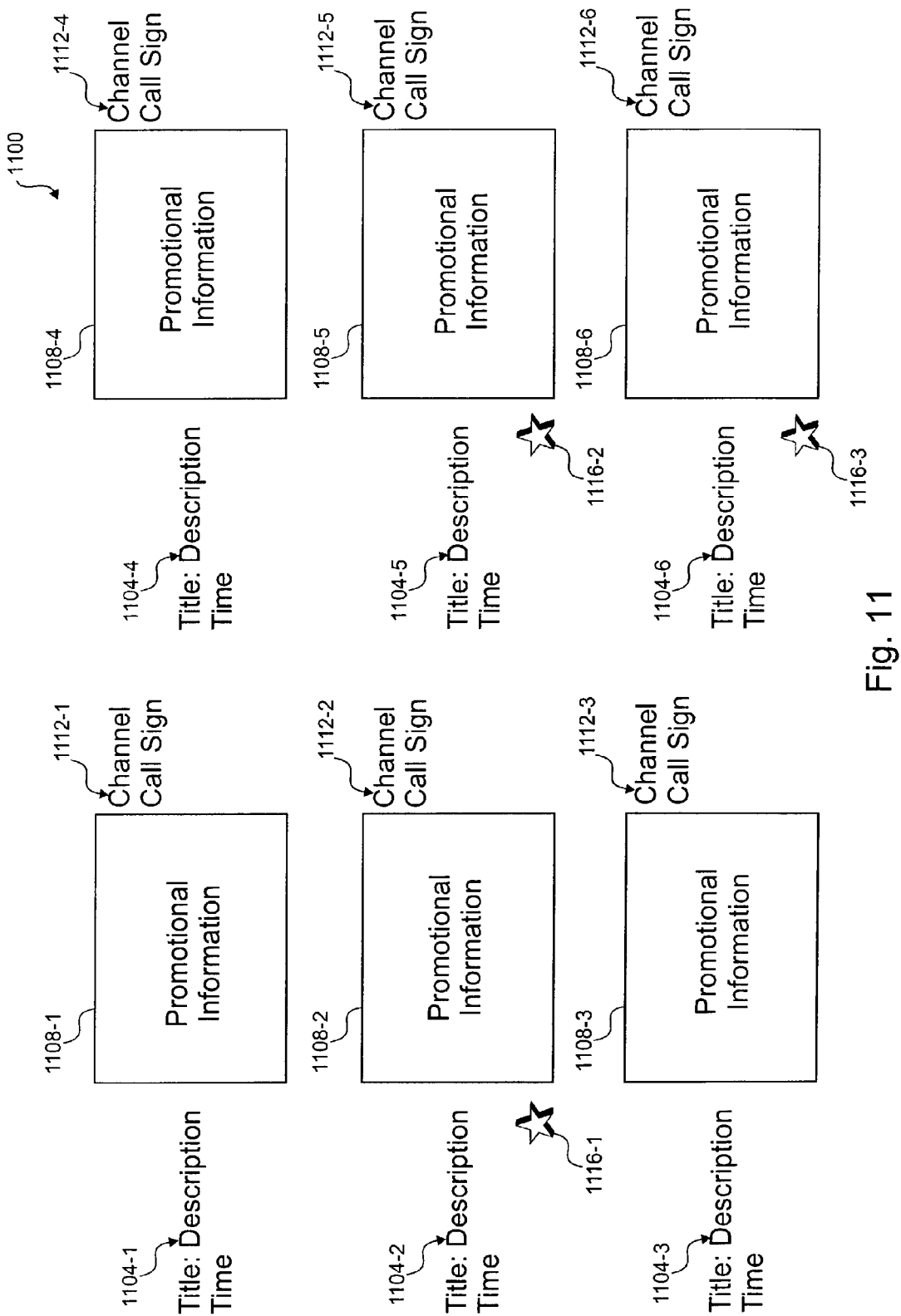
FIG. 11 is a screen shot depicting an embodiment of a guide showing promotional information for a number of programs.

Referring next to FIG. 11, a screen shot depicting an embodiment of a guide screen 1100 showing promotional information 1108 for a number of programs is shown. The guide 1100 could display the programs on the local program server 204, the SVOD selections available, the VOD selections available, linearly scheduled programs, or a mix of these types of programs. Any guide could be customized according to preferences for the user. For example, the six depicted programs could be from channels the user specified in their profile or could be programs the set top box 120 has determined the user will enjoy. A guide title (not shown) would indicate which types of programs are being displayed in the guide. By viewing the guide 1100 with the six program zones of this embodiment, the user can quickly determine a program to play.

The guide screen 1100 could be shown when changing channels or viewing of a program has ceased, for example. The programs shown on the guide screen 1100 could be selected from the context of the content provider of the show that was just watched or the content provider or affiliate associated with the channel tuned to. For example, the user stopped playing a SVOD selection from Content Provider A and a guide screen 1100 is displayed that shows other selections from Content Provider A that could be tailored to the user's profile.

Using keys on the remote, for example, the user can move the focus to any of the promotional information areas 1108. The promotional information is stored in the guide database 164. The promotional information could include a video clip, a video clip with audio accompaniment, an audio clip, a still image with audio accompaniment, an animation, an animation with audio accompaniment, a still image, a plurality of still images, and/or a plurality of still images with audio accompaniment. When a particular zone is in focus, any sound for that image is played while the sound for the other images is muted. Further, moving focus to a particular zone may highlight that promotional information 1108 and provide enhanced summary information 1104 for that program. For example, a larger version of the image 1108 could be displayed when that zone is in focus. In some embodiments, the image 1108 may switch between two possibilities when that zone is in focus. For example, a static image could be shown until that zone is brought into focus where a moving image or animation is presented.

By pressing a button on the remote while focus is on a particular image 1108 or zone, the corresponding program can be played. A menu page or menu overlay may be activated by that button to allow playing a program, subscribing to a club or subscription service for that program, authorizing a one-time fee to view the program, playing or deleting a stored program, etc. In some embodiments, moving focus to a particular zone presents buttons on the guide screen corresponding to some of these options in lieu of a separate menu page or menu overlay.

The promotional information 1108 and/or program descriptions 1104 may be made general to a number of programs. For example, a clip 1108 for a series of programs could be reused for each program in the series where the program descriptions 1104 could change for each episode. In some embodiments, there may be default promotional information 1108 and/or program descriptions 1104 for a particular channel such that if no specific information were provided the default promotional information 1108 and/or program descriptions 1104 could describe the particular channel.

The six zones of the guide 1100 each describe a particular program with summary information 1104, promotional information 1108, and content provider information 1112. The program could be an audio or video program. Summary information 1104 is provided for each program and could include, for example: a title, a description, a program length, a start time for programs in the linear schedule, actors, a content advisory rating, a reviewers rating, and/or other information.

Each zone has promotional information 1108 which could be a static or dynamic image, such as a picture, advertisement, video clip, audio clip, slide show of images, animated image, etc. This promotional information 1108 is stored in the local guide database 164 for this embodiment, but could be stored remote to the user location in other embodiments. Where the program associated with the zone is a currently playing program, a live view of that program could be displayed. Where there are not enough tuning resources to dedicate a tuner for each currently playing program, the tuner resources could cycle through the live programs to capture a still frame such that the promotional information 1108 is updated with a static image or small clip before the tuner resource(s) is switched to the next zone. Other embodiments could receive promotional information 1108 from a datachannel, for example, a DOCSIS or other packet-switched network.

Each zone also has content provider information 1112. In this embodiment, the content provider information includes a channel and call sign associated with the content provider, but could also include a logo, a language, a nationality, etc. Further, the program of each zone could be influenced by the profile of the current user. The user confirmation footer 412 could be used to verify or change the current user.

Some zones in the depicted embodiment of the guide 1100 further include a notification symbol 1116. A notification symbol 1116 indicates that the program associated with that zone is immediately available for playback with full or partial control of the playback as a VOD, SVOD or recorded program. Those zones without the symbol are part of the linear schedule and can be watched while the program is broadcast, but are not currently stored so as to allow rewinding, etc. The notification symbol 1116 could have a number of variants to indicate the type of program (e.g., stored program, SVOD or club program, VOD program), limited availability of the program, a charge is associated with viewing the program, the content provider associated with the program, etc. The notification symbol can be a static icon or an animated icon.

Figure 12:
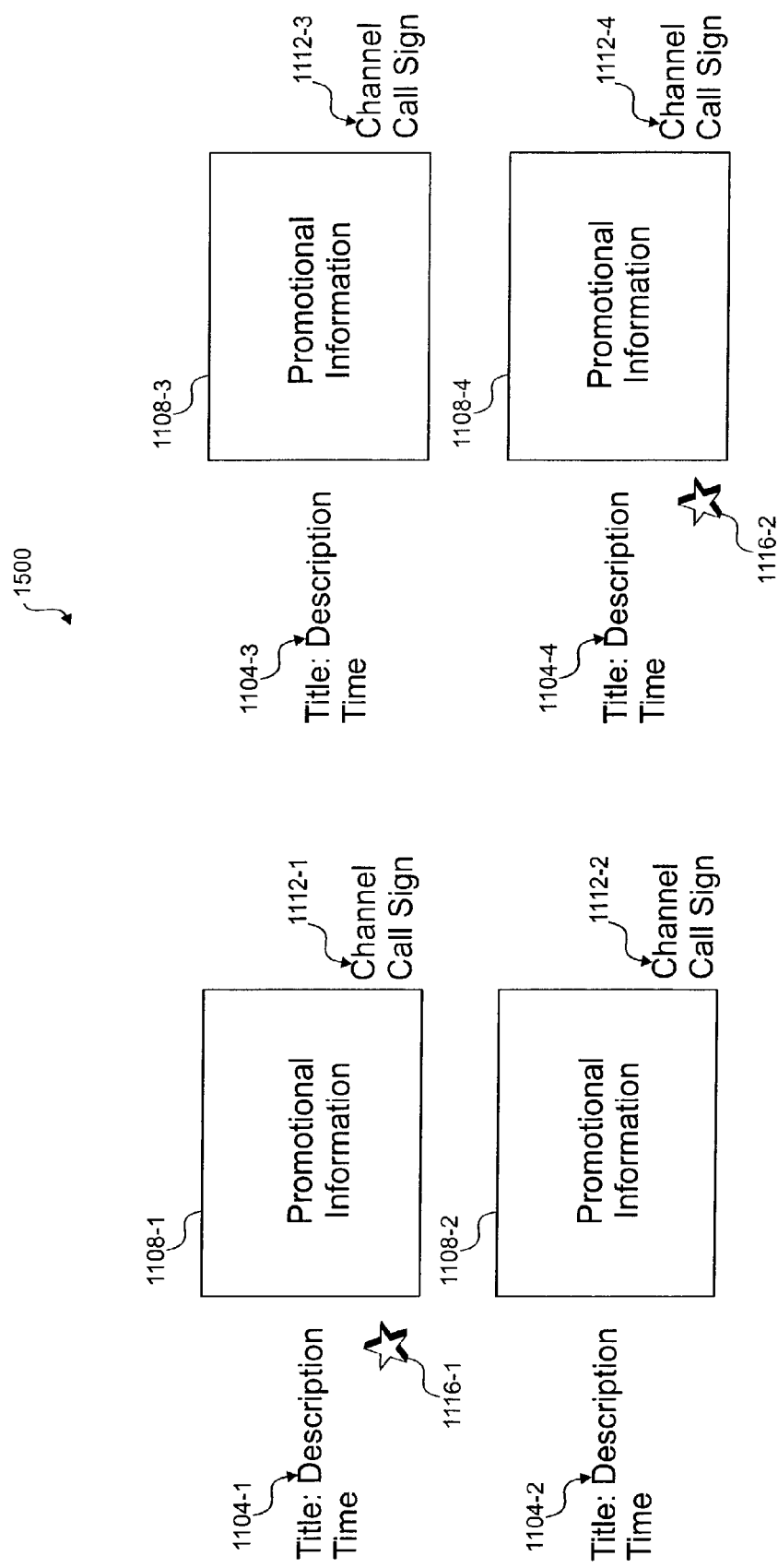
FIG. 12 is a screen shot illustrating another embodiment of the guide showing promotional information for a number of programs.

With reference to FIG. 12, a screen shot illustrating another embodiment of a guide 1200 showing promotional information 1108 for a number of programs is shown. This embodiment has four zones to display information on four programs at a time. These four zones could share the screen with a grid of program guide information such that it were situated to the right or left of the program grid or video. Other embodiments could have two zones, eight zones or any number of zones for any number of programs. As the resolution of display screens increase so can the number of zones such that the promotional information 1108 has adequate resolution. For example, a HDTV system could have more zones in a guide than the resolution of a NTSC system could support adequately. Wide aspect-ratio television screens could display this information in the unused pillar box portions. Conversely, standard aspect ratio televisions could display this information in the unused letter box portions.

Figure 13:
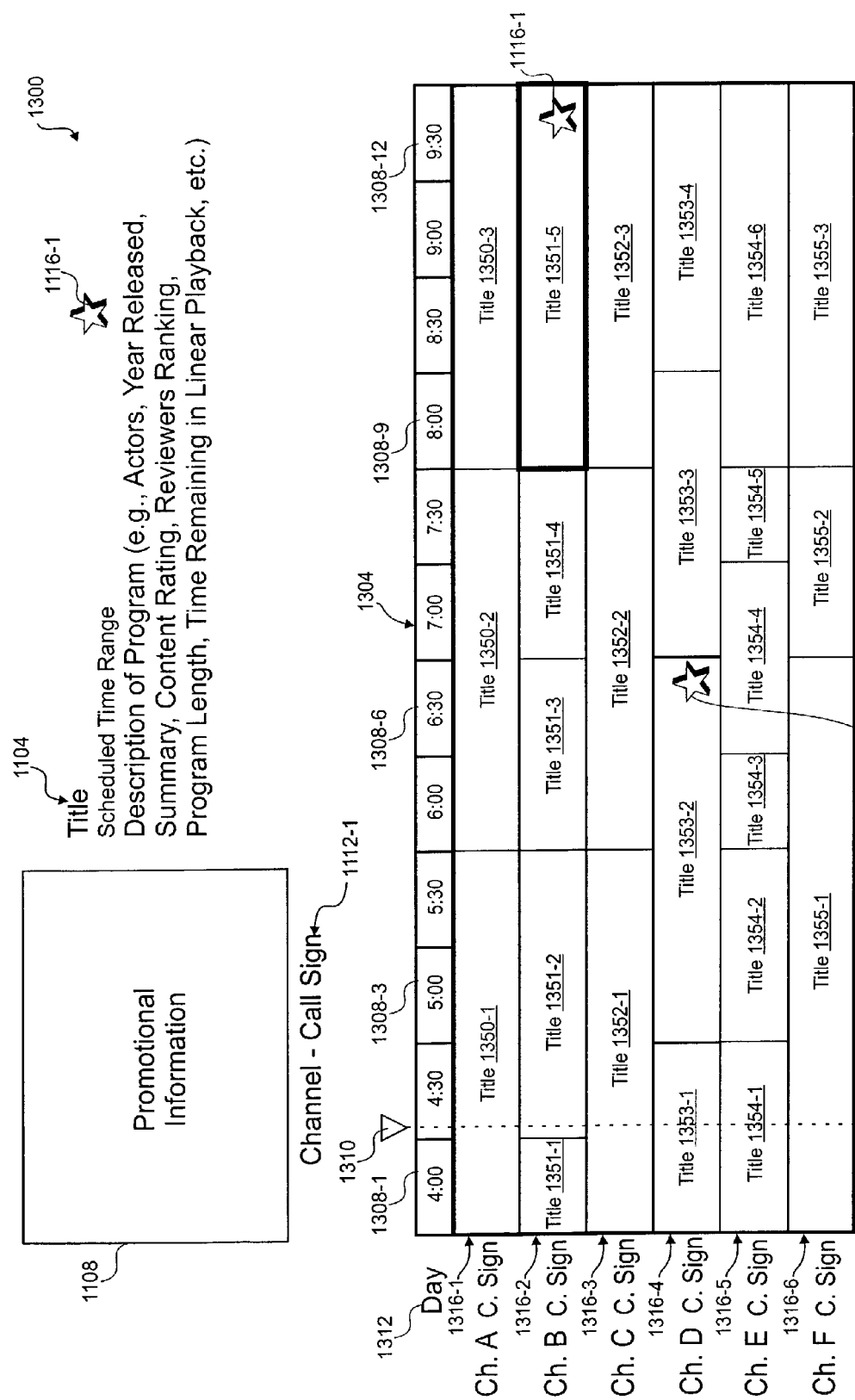
FIG. 13 is a screen shot illustrating an embodiment of a guide showing a linear schedule of programs where a program can be selected for further information.

With reference to FIG. 13, a screen shot illustrates an embodiment of a guide screen 1300 showing a linear schedule of programs 1304 where a program can be selected for further information. The guide screen 1300 could be accessible in the menu system or as a cross-promotion. A current time indicator 1310 shows the time of day with respect to the schedule grid.

In this embodiment, a program 1351-5 playing between 8:00 and 10:00 and on Channel B 1316-2 is selected as indicated by the bold outline, but other embodiments could change the color, shading, or otherwise indicate that a program is selected. Selection of the program automatically brings up the promotional information 1108 for that program 1351-5. Promotional information 1108, a program description 1104, any notification symbol 1116, and a channel and call sign 1112 is shown for the selected program 1351-5. Pressing the select button on the remote brings up a window that allows watching the program in the guide 1300 or full-screen. If the user is not authorized for watching a SVOD, VOD or premium content program, the user is solicited to upgrade their service to allow watching the program.

The linear schedule of programs in this embodiment is arranged in a grid of times along one axis and digital channels along the other axis. Although this embodiment receives programs on digital channels, any of embodiments in this application could receive programs on analog channels, packet switched channels, etc. This embodiment divides the time axis into half-hour increments 1308 for a total of six hours, however, other embodiments could use different increments 1308 and a different total. A day of the week 1312 is in the upper-left corner of the program grid 1304.

Six channels 1316 are displayed in this embodiment, while other embodiments could have more or less channels displayed. Each channel 1316 in this embodiment has a channel number and call sign displayed, where each program in the grid 1304 displays a title for each program. The programs may be of different lengths, for example, channel F 1316-6 has a three hour program 1355-1, a hour show 1355-2 and a two hour shows playing between 4:00 and 10:00. A notification symbol 1116 for the selected program 1351-5 and another program 1353-2 indicates the program is also immediately available with playback manipulation as a stored program, a VOD program or a SVOD program.

Figure 14:
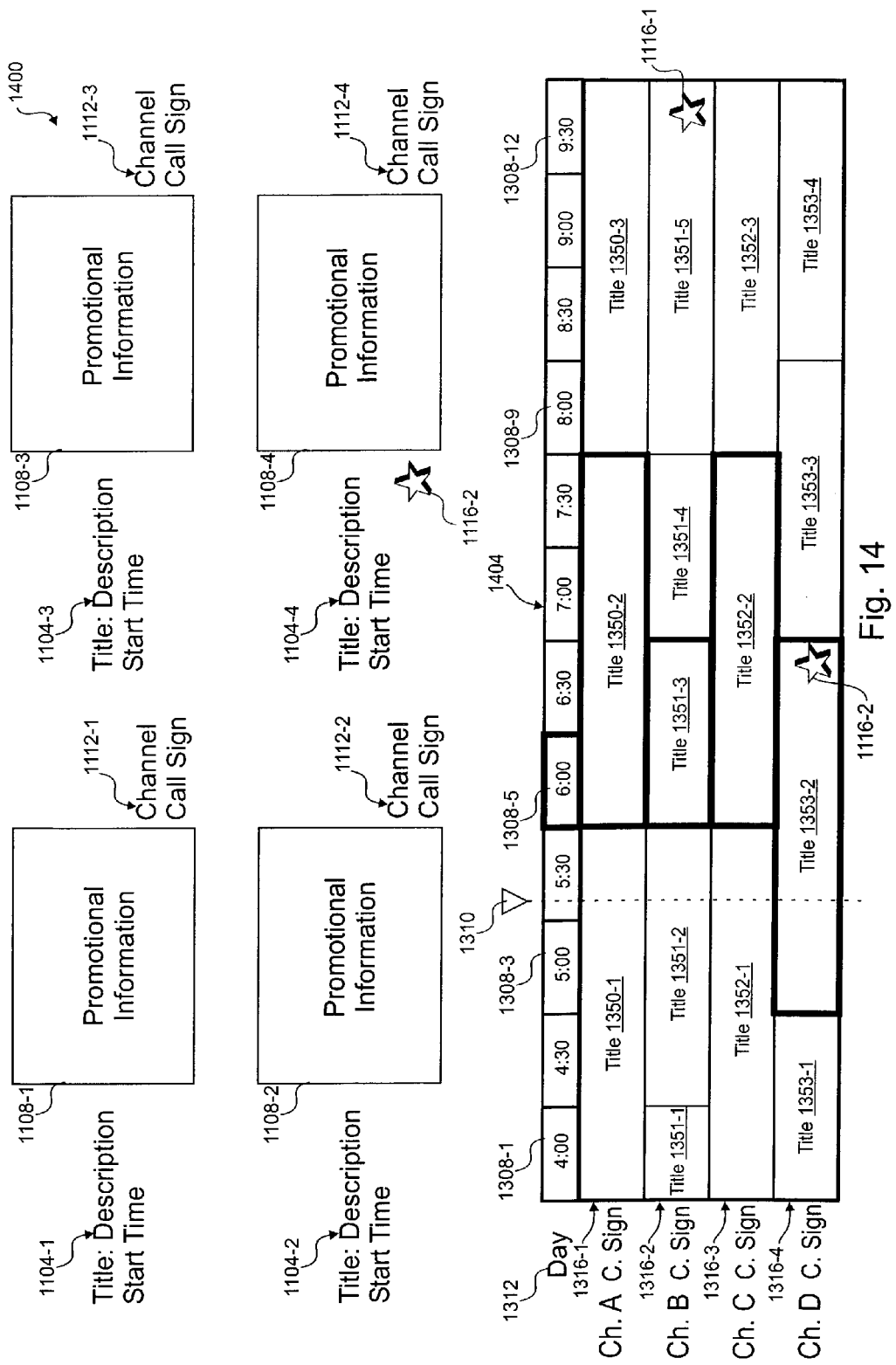
FIG. 14 is a screen shot illustrating another embodiment of the guide showing a linear schedule of programs where a column of programs can be selected for further information.

With reference to FIG. 14, a screen shot illustrating another embodiment of the guide menu 1400 shows a linear schedule of programs 1404 where a column of programs can be selected for further information. The guide menu could be part of the guide in the set top box 120 or as a cross-promotion menu. Where a time column is selected, all the programs playing during that time are detailed in the top portion of the guide 1400 with promotional information 1108, description information 1104 and content provider information 1112. In this embodiment, four channels 1316 are displayed in the bottom portion of the guide 1400 with four detailed programs in the top portion of the guide 1400. By selecting a particular program in this embodiment, the guide transforms to detail that single program such as is shown in the embodiment of FIG. 13. Selecting a column switches back to the guide 1400 shown in FIG. 14. Some embodiments may have the same number of channels 1316 regardless of whether a single program or a whole column of programs are detailed. Using the remote, the user may increase the number programs detailed in the top portion and the number of channels displayed in the guide 1400.

This embodiment allows selecting a whole column of programs for more detailed information. Other embodiments could also allow selecting a whole row of programs for more detailed information such that a number of programs for a given channel 1316 are displayed. For example, Channel A 1316-1 could be selected by focusing on the call sign. This would detail three programs in the top half of the guide. Since the top half of the guide screen could show one, two, four, six, eight programs easily, selecting a channel with a number of programs between that value could increase the number of detailed programs appropriately. For example, selecting Channel B 1316-2 could detail six programs in the top half of the guide 1400 by pulling the program that starts at 10:00 such that six programs could be detailed at once.

Figure 15:
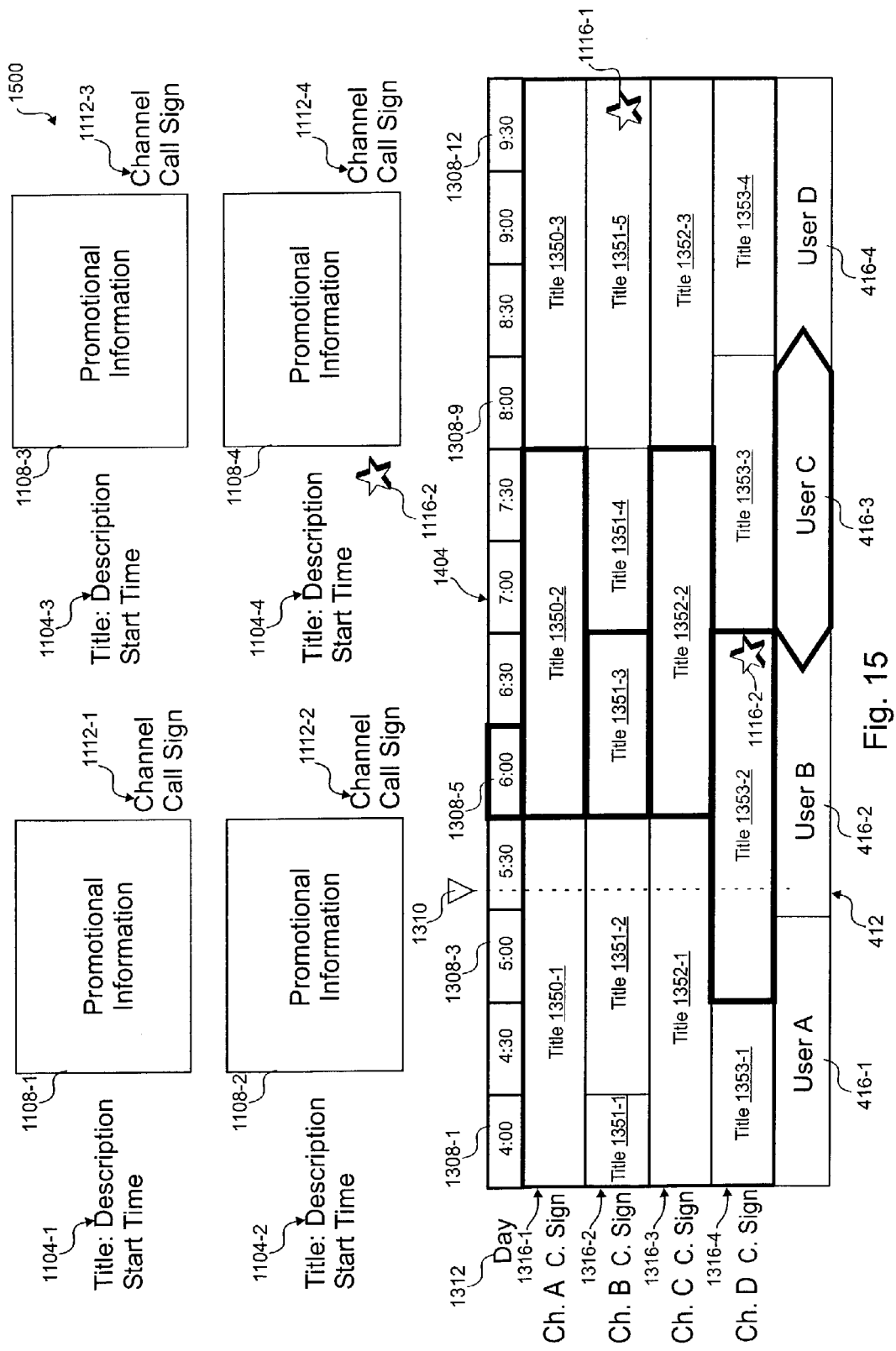
FIG. 15 is a screen shot illustrating yet another embodiment of the guide showing a linear schedule of programs customized for the user.
Figure 16:
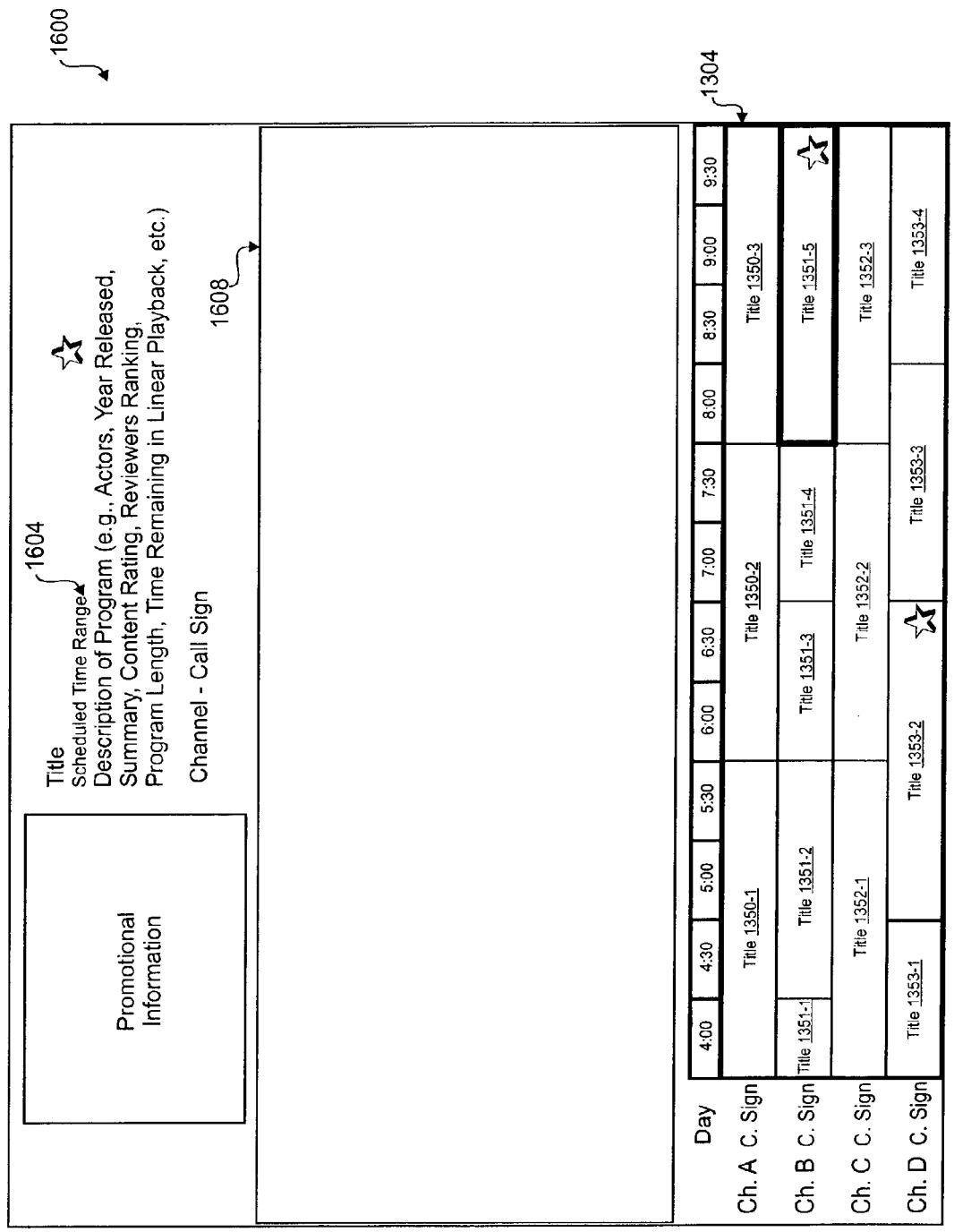
FIG. 16 is a screen shot illustrating an embodiment of letterbox screen with menu information in unused portions.

Referring next to FIG. 15, a screen shot illustrating yet another embodiment of the guide menu 1500 is shown that illustrates a linear schedule of programs customized for the user. This embodiment shows the user confirmation footer 412. User C 416-3 is the determined user in this embodiment. The grid of channels 1316-2 is chosen according to the preferences of user C 416-3. The actual user can correct the determined user by moving the selection to himself or herself. Any correction would update the channel grid according to any customizations of the profile for the actual user. Further, the actual user could further customize how and when the guide menu 1500 appeared.

Figure 17:
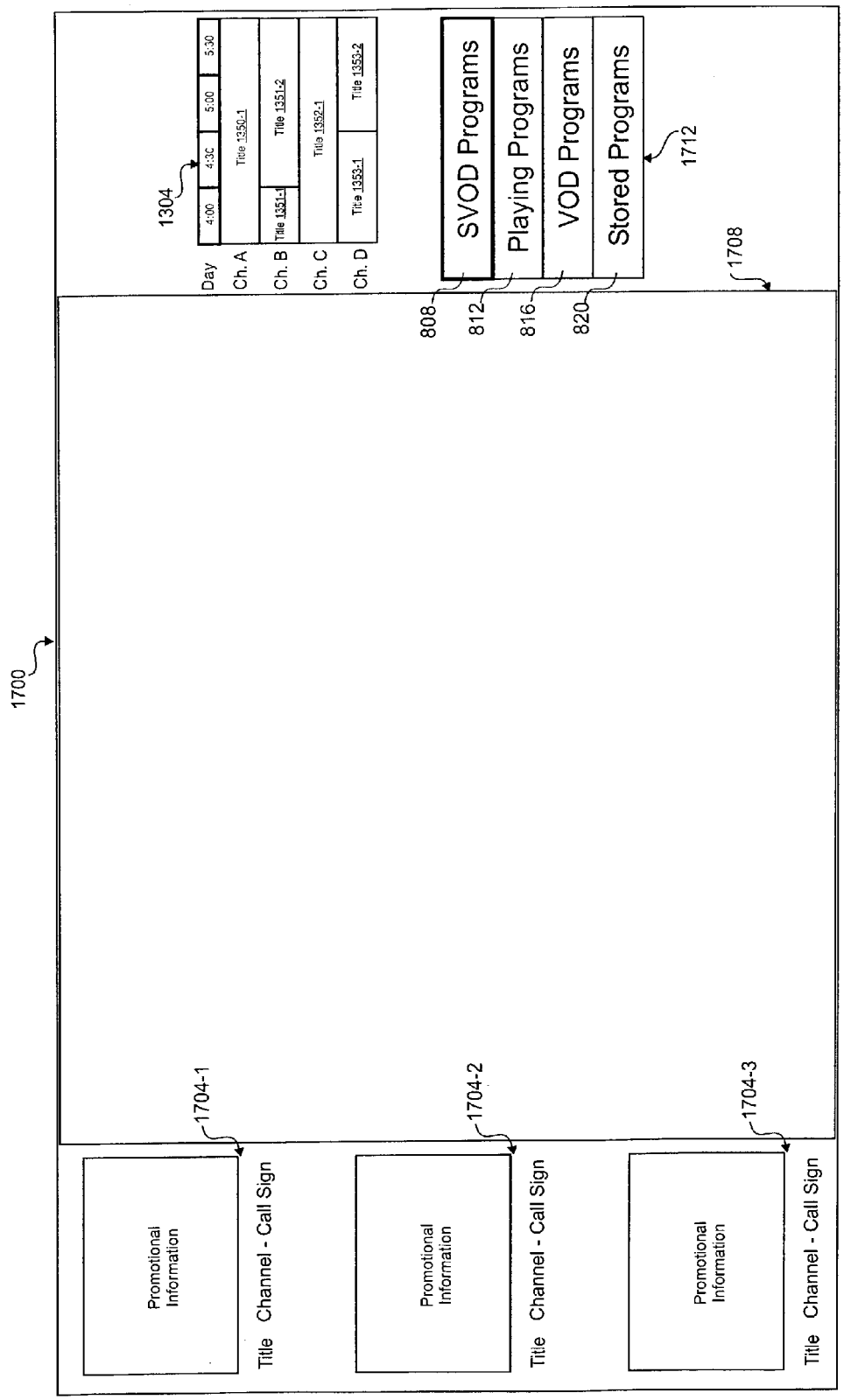
FIG. 17 is a screen shot illustrating an embodiment of a pillar box screen with menu information in unused portions.

With reference to FIG. 17, a screen shot illustrating an embodiment of letterbox screen 1600 is shown with menu information in unused portions. The unused portions of a letterbox screen 1600 above and below a video portion 1608 can be used to present cross-promotion menu information. The menus could be ephemeral or persistent. In this embodiment, the menus are ephemeral if activated when the video is in motion, but persistent when the video is paused or stopped. Other contexts could trigger either the ephemeral or persistent versions of the menus, for example, the menu could be persistent during the opening or closing credits or during a commercial break.

The letterbox screen 1600 could display any number of menu configurations in the unused portions. This embodiment shows a linear schedule 1304 of programs in the bottom portion and detailed information 1604 on a particular program in the top portion. Some embodiments could have detailed information on a number of shows, for example, from a selected column of the linear schedule 1304. Other embodiments could include program categories or a number of programs in the unused portions. The content provider could include metadata with the program to indicate its aspect ratio, which could be compared with the aspect ratio of the television display to determine which portions are unused. Other embodiments could use pattern recognition to determine which portions of the screen are unused. The menu information could appear in any number of configurations to support the different possible combinations of aspect ratios between the video and the television display.

Referring next to FIG. 17, a screen shot illustrating an embodiment of a pillar box screen 1700 is shown with menu information in unused portions. This embodiment places categories of shows 1712, linear program schedule 1304 and show specific information 1704 on the unused portions of the pillar box screen 1700. The user can select one or more programs in the linear schedule 1304 that will produce more show specific information 1704 for those programs. Alternatively, a category of programs 808, 812, 816, 820 could be selected to produce show specific information.

Where all the information in the show category section 1712, linear schedule section 1304 and show specific section cannot be seen, the user can scroll to respectively show more categories, linear schedule and show specific information 1704. In this embodiment, the SVOD program category 808 is selected, which causes show specific information to be displayed on three SVOD selections. Scrolling in the left unused portions allows showing show specific information 1704 on additional programs in that category 808. The left unused portion could curtail the information on each selection in the chosen category to allow displaying specific information on more programs. Selection of a specific program will cause it to be displayed in the video portion 1708.

Figure 18A:
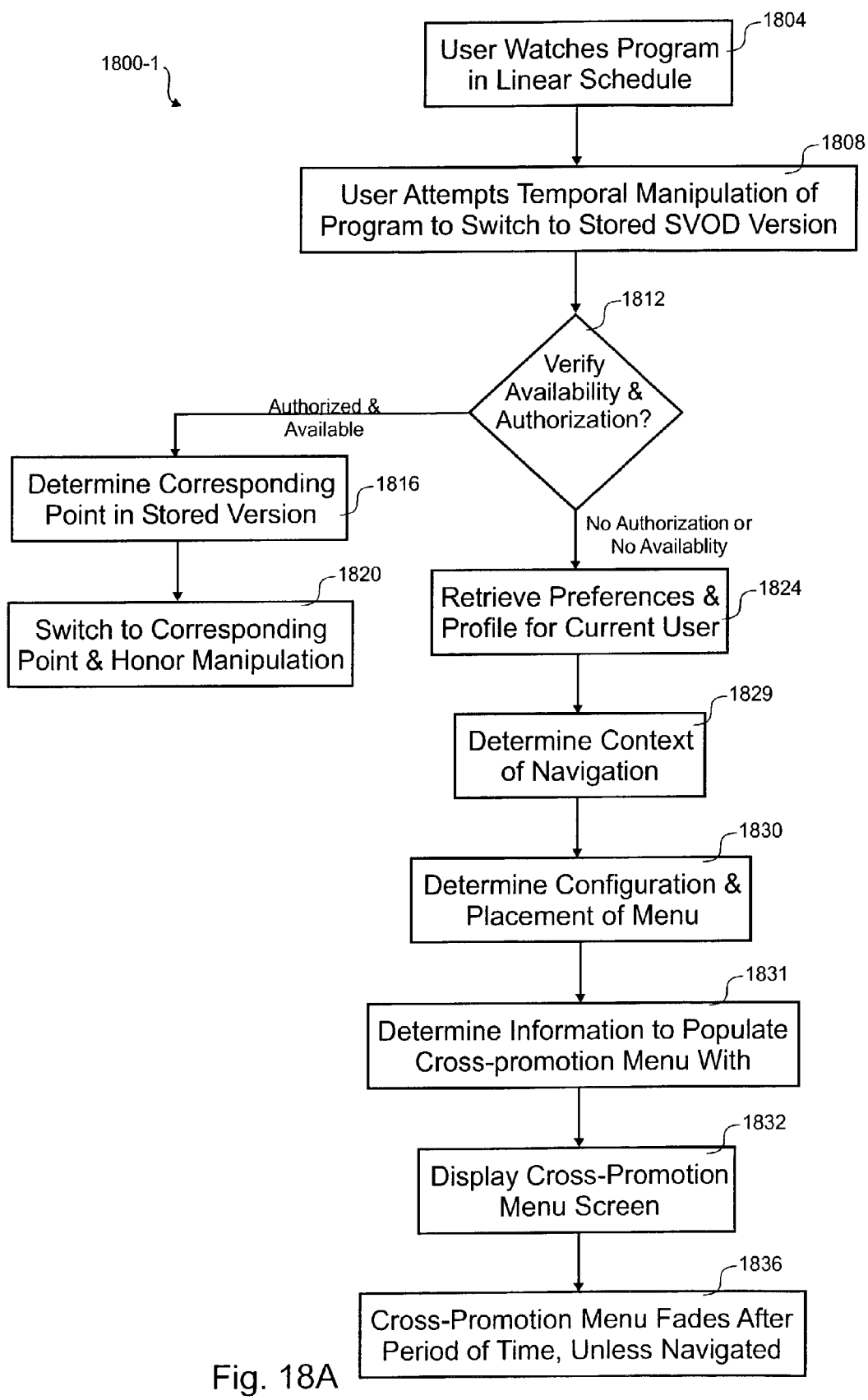
FIG. 18A is a flow diagram of an embodiment of a process for cross-promotion when viewing of a club program is unsuccessfully attempted.

With reference to FIG. 18A, a flow diagram is shown of an embodiment of a process 1800-1 for cross-promotion when viewing of a club program is unsuccessfully attempted. In this embodiment, the user attempts to switch from a linearly scheduled program to a SVOD equivalent. Where such a switch is unauthorized or otherwise unavailable, a cross-promotion menu is shown. That cross-promotion menu could show categories of alternatives, the linear schedule and/or selections of alternative programs, for example, see the embodiments in FIGS. 6A-8B and FIGS. 11-15. Although this embodiment addresses a scenario when a SVOD program is unauthorized or unavailable, other embodiments could address situations where any stored program is unavailable, for example, a VOD program or a previously recorded linear program could be now unauthorized or unavailable.

The depicted portion of the process 1800-1 begins in step 1804 where a user watches a program in the linear schedule. In step 1808, an attempt is made to temporally manipulate playback such that viewing switches to a stored version of the program. That program could be stored at the user location, a neighborhood node, the headend, or elsewhere in the video delivery plant. Availability and authorization is verified in step 1812. A notification symbol 116 is shown for programs that can be viewed as a SVOD selection. In some cases, the program is not available as a SVOD selection or has been deleted for some reason. At other times, the user may not be authorized to view the club or SVOD programs. Some embodiments could attempt to recruit the user to join the club or pay for a VOD viewing of the program.

Where the equivalent stored version of the program is available and the user is a club member, processing continues from step 1812 to step 1816. The point in the stored program that corresponds to the point in the linear playback of the program is found in step 1816. As seamlessly as possible, the stored version is switched to in step 1820. From that time forward, the user can view the program with full control of playback.

Where either the program is unavailable or the user is not authorized to view the program processing continues from step 1812 to step 1824. The preferences and profile are retrieved for the user in step 1824 from the preference database 160. The user could be shown the user confirmation footer 412 such that any corrections to could be made. Any correction would result in the preferences and profile for that user being retrieved to replace the previous information.

In step 1829, the context of the navigation is considered such as whether there is underlying video to display with the menu, whether the video is in letterbox or pillar box format, what type of program was being viewed before the interruption, etc. The context is used when determining which configuration of cross-promotion menu and if a full-screen or partial screen, ephemeral or persistent, and/or opaque or transparent cross-promotion menu should be used in step 1830. Additionally, displaying menu information on unused portions of the screen is considered where the video is in letterbox or pillar-box format. When determining the type and placement of the menu, any user preferences are also considered.

Some embodiments could consider content affiliations in the consideration of context. In this case, only cross-promotions of affiliated programs would be allowed. The content provider associated with the stored program or linear channel giving rise to the cross promotion could define the programs that could be cross-promoted. The content provider may only allow cross-promotion of their own content on this and/or other channels. Other content providers could be charged a fee for inclusion in the cross-promotion. Some content providers may forgo the opportunity to cross-promote for some or all shows they provide.

Once the type of menu and placement is determined, preparations are made to display that menu. Information is gathered from the guide database 164 to populate the cross-promotion menu in step 1831. Generally, the user preferences and viewing habits are used to determine the alternatives to present to the user. Also, product placement arrangements with content providers could be considered to influence the categories and programs presented to the user. In this embodiment, an opaque and partial-screen menu is used in step 1832 to display other stored programs similar to the manner of the embodiment in FIG. 7B. The portion of the screen not covered by the partial-screen menu shows the original program in the linear schedule. In this embodiment, the cross-promotion menu is ephemeral and fades after a period of time unless navigation within the menu is performed.

Viewed from the perspective of the user, the interaction would begin with the user attempting to manipulate playback. The manipulation would occur if available and authorized. Where either unavailable or unauthorized, a partial-screen menu would appear that would suggest alternative programs that are stored and available for playback. The linear program could be shrunk to accommodate the cross-promotion information while playback of linear program continues. Navigation in the menu could be performed to activate an alternative stored program.

Figure 18B:
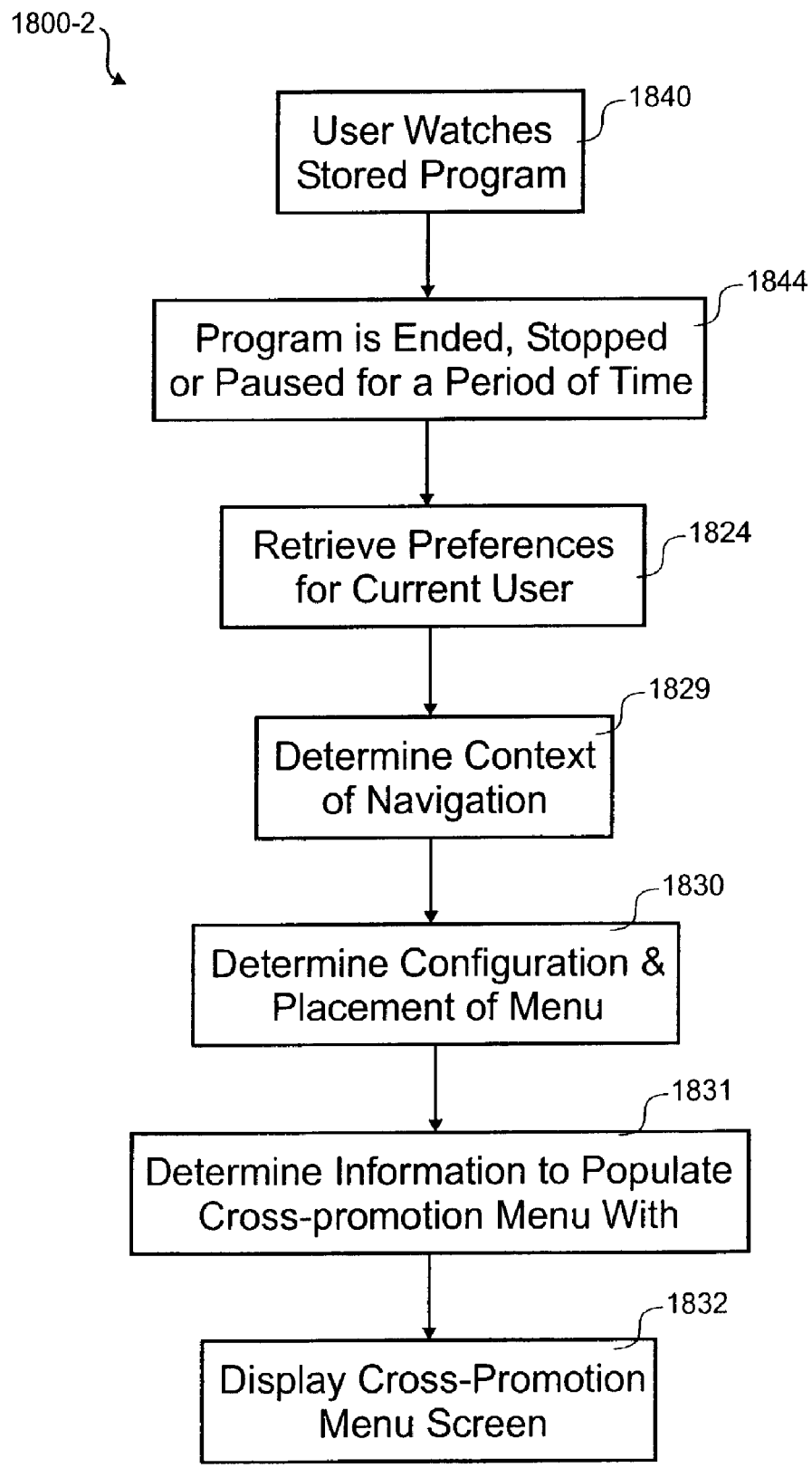
FIG. 18B is a flow diagram of an embodiment of a process for cross-promotion when viewing of a stored program is ended, stopped or paused.

Referring next to FIG. 18B, a flow diagram is shown of an embodiment of a process 1800-2 for cross-promotion when viewing of a stored program is ended, stopped or paused. The depicted portion of the process 1800-2 begins in step 1840 where the user is watching a stored program. This program could be a SVOD, VOD or program recorded from the linear schedule. In step 1844, the program is paused, stopped or ended, which triggers the cross-promotion menu. Some embodiments could wait a period of time after the pause, stop or end before displaying a cross-promotion menu. Where a program becomes unavailable some embodiments could display a menu also, for example, when there is a cable outage during playback of a linear or stored program.

The remaining steps of the process are largely explained in relation to FIG. 18A. The context considerations in this embodiment are unique. When the program has ended, a full-screen opaque menu is presented to the user for selecting another program. Where the stored program was initiated from a linear program, the menu could be partial screen and transparent with the current program from the original linear channel playing underneath. Where a program is stopped or paused, the cross-promotion menu appears over a portion of the screen with the still image of the interrupted video partially covered. The menu could be partially transparent in portions to allow more of the still image to be perceptible.

Some embodiments could show a cross-channel promotion menu during certain times in temporal manipulation. For example, when various speeds of fast forward and rewind are activated, a cross-channel promotion menu could be activated to partially cover the screen. The video could be clipped or shrunk to accommodate the portion of the screen used for the menu.

Figure 18C:
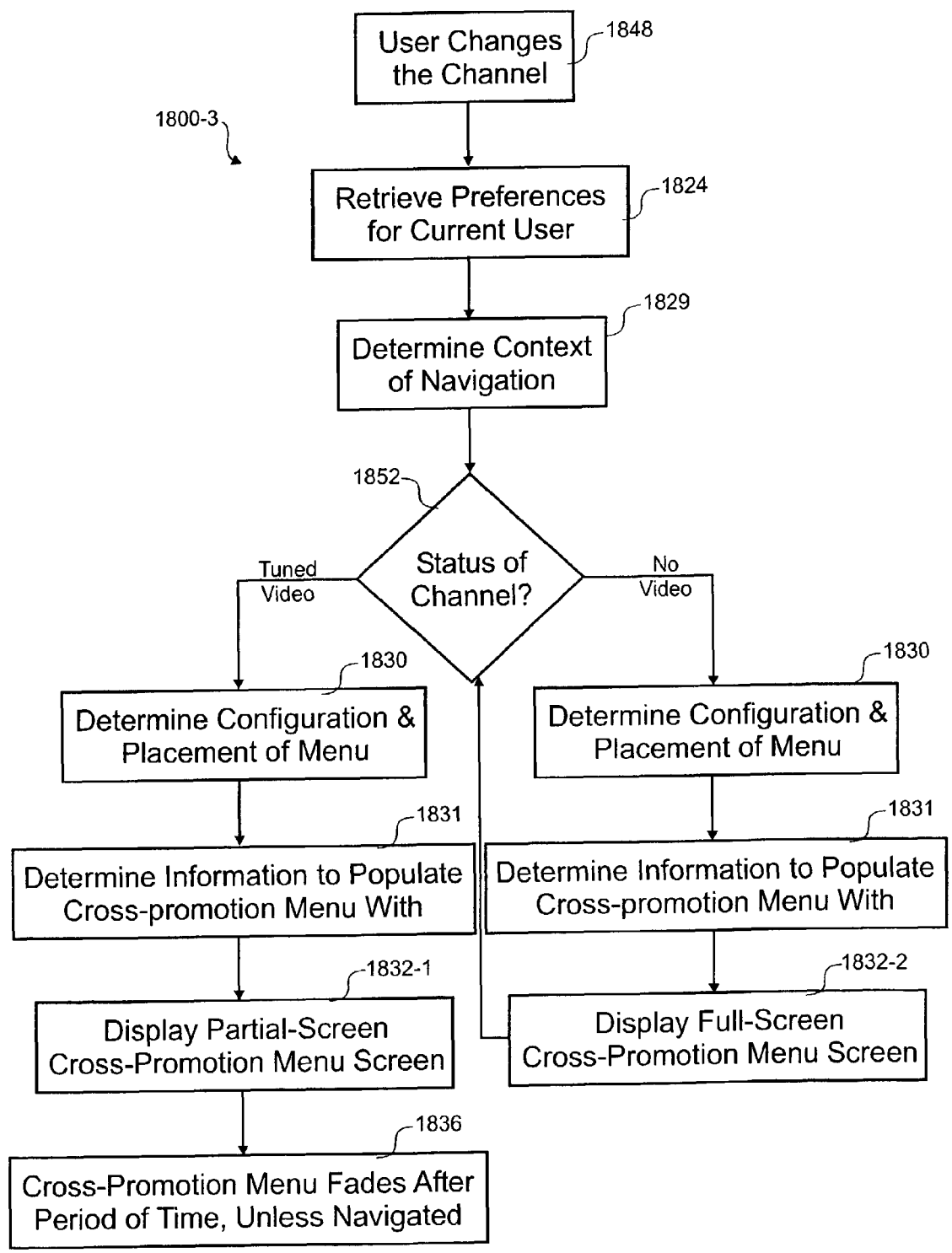
FIG. 18C is a flow diagram of an embodiment of a process for cross-promotion when tuning channels.

With reference to FIG. 18C, a flow diagram of an embodiment of a process 1800-3 for cross-promotion when tuning channels is shown. When changing channels or tuning to a channel, this embodiment displays cross promotion information. Tuning channels of analog video occurs relatively quickly, but compressed and/or digital channels can take some time to tune. In some cases, there isn't any tunable signal on a particular channel. This embodiment places a full-screen cross-promotion menu where no video is currently available and a partial-screen cross-promotion menu that is ephemeral where there is a video signal.

The depicted portion of the process begins in step 1848, where the user changes to a new channel or otherwise tunes to a channel. In some cases, the tuning could be to the same channel where the signal has been interrupted for some reason such that signal interruptions would also trigger the cross-promotion menu. After steps 1824 and 1829 are performed as described above, a decision in step 1852 decides if a video signal can be displayed. A video signal could be missing because it is not there, too weak, encrypted or scrambled, still being decoded, etc. Steps 1830, 1831 and 1832-2 are performed as above to display the full-screen cross-promotion menu in a loop until a program is displayed for the user. In some systems, a video signal could be displayed with artifacts for a period of time before a normal video signal is displayed. During that artifact period, a full-screen or partial screen menu could be visible to the user.

Once a video signal is displayed, as determined in step 1852, processing continues to steps 1830, 1831, 1832-1, and 1836 in the manner described in relation to the other figures. A partial-screen menu is displayed in step 1832-1, but ephemerally fades away in step 1836.

Figure 18D:
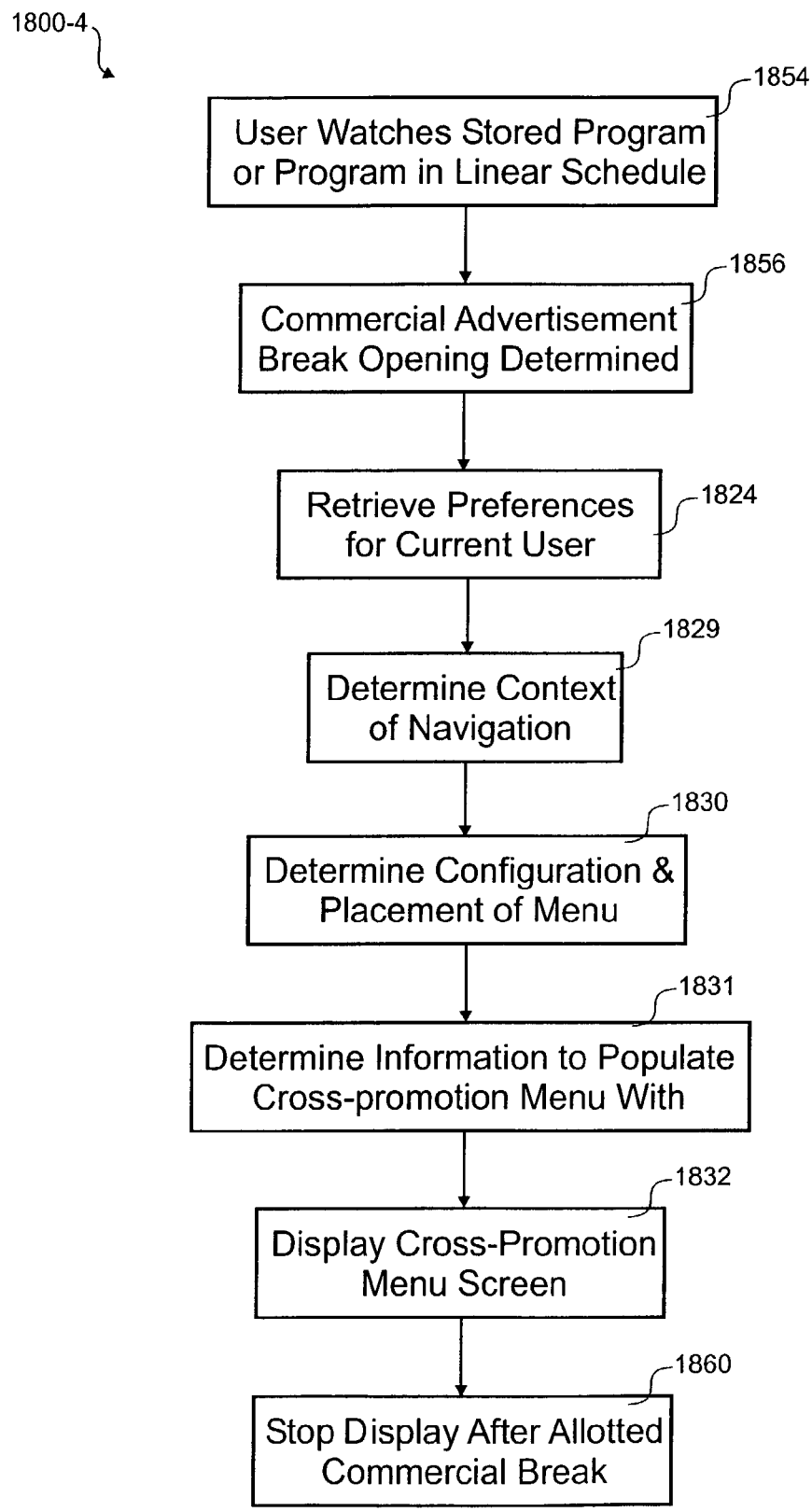
FIG. 18D is a flow diagram of an embodiment of a process for cross-promotion during a commercial break.

Referring next to FIG. 18D, a flow diagram of an embodiment of a process 1800-4 for cross-promotion during a commercial break is shown. This embodiment allows inserting a cross-promotion menu into a commercial break. The depicted portion of the process 1800-4 begins in step 1854 where a user views a stored or live program with interlineated commercials. A point of insertion in a commercial break is detected in step 1856. A full-screen cross-promotion menu could be inserted like a commercial or a partial-screen cross-promotion menu could be inserted for one or more of the existing commercials. The partial-screen cross promotion menu could be ephemeral in some embodiments.

Processing continues through steps 1824, 1829, 1830, 1831, and 1832 as described above. After the allotted time for the cross-promotion menu has expired it is removed or fades to allow other commercials or a return to the program. The insertion points could be embedded as metadata in the program or sent through a separate signaling channel to the set top box 120. Alternatively, the insertion could be performed remote to the user location. Some embodiments could insert cross-promotion menus into the video being played such that insertion is not limited to a commercial break. For example, every half hour a partial-screen menu could overlay the video presentation. These cross-promotions could also be timed to certain events in the show such as scene changes or slow moving portions. Also, the cross-promotion could be tied to the alternative content. For example, the menu could appear while watching a movie to note that half-time has ended for a sports event that might be of interest to the user.

Figure 19:
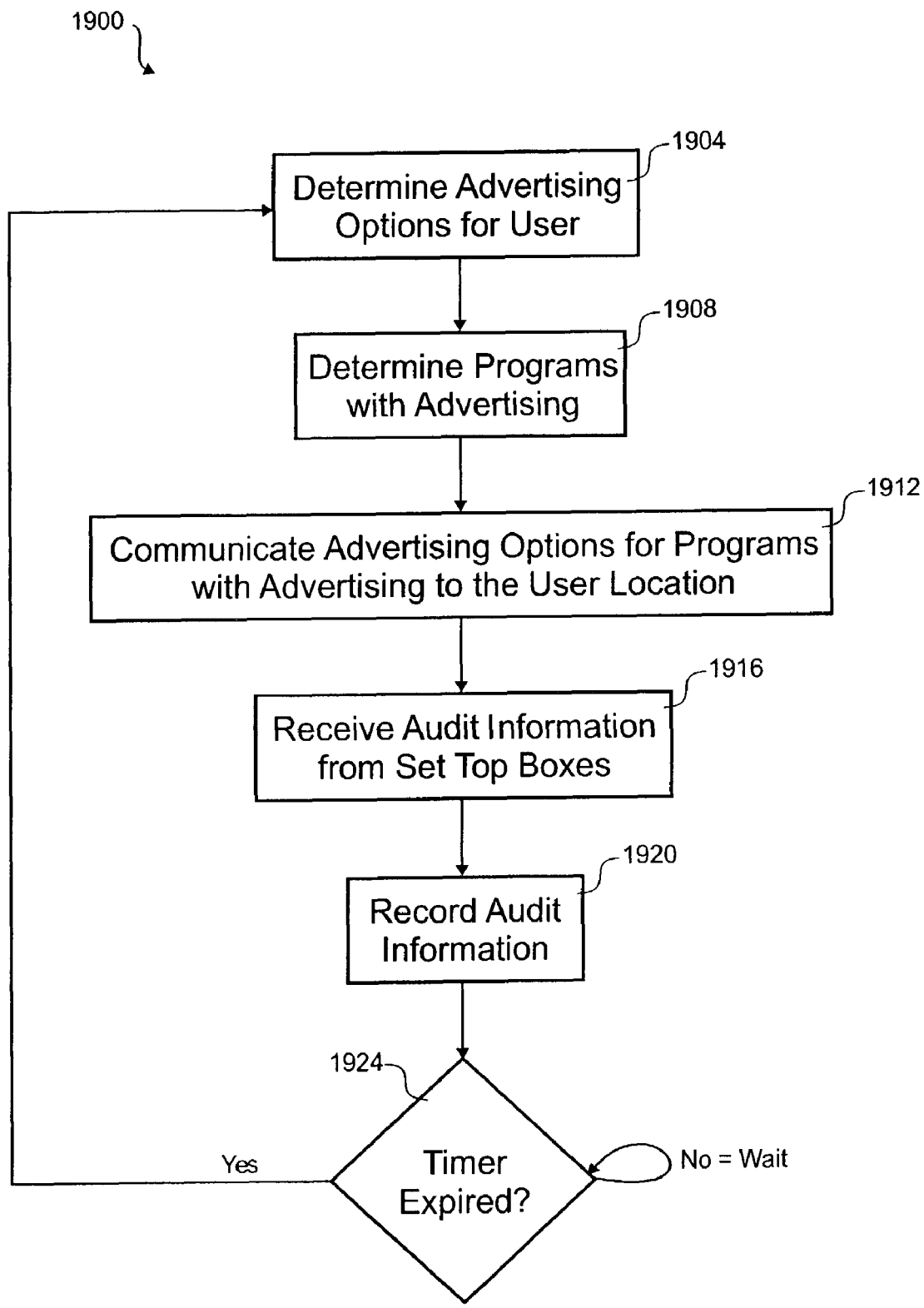
FIG. 19 is a flow diagram of an embodiment of a process for authorizing and monitoring curtailment of advertising.

Referring next to FIG. 19, a flow diagram of an embodiment of a process 1900 for authorizing and monitoring curtailment of advertising is shown. The STB 120 can automatically determine commercial breaks in programs. Alternatively, the STB 120 can be told where the commercials appear in programs. Data indicating the position of the advertisements in a program could be embedded in the program itself or could be sent separately from the program. In this embodiment, the location of the commercials is sent separately from the program in an encrypted channel. By knowing where the advertising appears in a program, those commercials can be removed. Control can be applied to the removal of commercials.

These commercials can appear in linearly scheduled programs or free VOD (FVOD) programs. FVOD programs include interlineated commercials with a VOD experience that is generally without monetary cost to the user. These interlineated commercials can appear at the beginning, end and/or throughout the program. Also, the interlineated commercials could be presented in a portion or a window of the screen while another portion is devoted to playing the program. In some cases, the commercials can be superimposed upon the program to appear as if they were part of the program when originally filmed. The superimposed commercial could be sent to the set top box 120, which would merge the commercial with the video according to position and timing specifications sent to the set top box 120. Some embodiments could place these commercials in the unused portions of a letterbox or pillar box video display. Other embodiments could shrink the video image to make room to display the commercial without clipping the video images.

In this embodiment, the depicted portion of the process begins in step 1904 where the advertising options for a user are determined. In some embodiments, the user would pay for the ability to curtail or eliminate some or all advertising. Various options are available for curtailing advertisement such as removal of all advertising, removal of certain classes of advertising, removal of commercials for certain products, removal of superimposed commercials, removal of interlineated commercials during the program, removal of commercials during temporal manipulation, removal of commercials at the beginning of the program, removal of commercials at the end of the program, removal of cross-promotion menus, allowing skipping of a single commercial, allowing skipping of a whole commercial break, allowing some or all temporal manipulation commands during a commercial, allowing or preventing targeted advertising customized for the user, allowing the opening or closing credits of a program to be skipped or temporally manipulated, and/or allowing removal of some or all windowed commercials. For example, users may be able to view a linear program with temporal manipulation from an attached DVR. A first user may not be able to fast-forward through a commercial break, but a second user would not even see the commercials during playback. Subsets of commercials can be treated differently with the advertising options, those subsets may exclude certain types of products. For example, certain communities could block commercials relating to alcohol or firearms when the program is played in a classroom.

In step 1908, the programs that can have the advertising options applied are determined. Generally, advertising appears in free linearly scheduled programs and FVOD programs. Some embodiments may allow manipulation of the commercials in all programs. In other cases, the content provider may only allow some programs to have the ability skip commercials, opening/closing credits, or otherwise temporally manipulate these portions. The advertising options for each user are communicated to the appropriate STBes 120 in step 1912. The advertising options could apply to all STBes 120 in a user location or a subset of the STBes in the user location. These options could be stored in the preference database 160. Appropriate encryption and digital rights management steps are taken to prevent alteration of the advertising options by unauthorized persons.

In steps 1916 and 1920, audit information is received from the various STBes 120 in the system and recorded. This audit information indicates how the advertising options were utilized, which commercials were viewed, which commercials were skipped and/or which programs were watched. This audit information could be gathered per account, per user, per user location, and/or per set top box. In some embodiments, the user may get credits for watching some advertising. These credits could be applied against debits for watching other programs with curtailed advertising or otherwise paid to the user. In some cases, the user can override their default advertising options to allow more advertising to increase the credits. The audit information can be used to determine viewership for a particular commercial. Viewership information could be used to more accurately charge advertisers for the impressions they have received and the relative quality of the user receiving the impression. In some cases, viewership of commercials are not correlated to a user's actual identity to protect their privacy. But, the advertiser may be able to get some demographic information on the user or get some preference information for the user.

In step 1924, the process can be repeated after a given interval. In this embodiment, the advertising options for shows are downloaded to the STBes 120 daily, but other embodiments could use other intervals. Although some of the above embodiments seem directed to allowing skipping or manipulation of commercials, other embodiments are not so limited. For example, previews, credits and/or warning messages for a movie could be selectively skipped or could have temporal manipulation disabled such that they must be played.

In other embodiments, the user interacts with a neighborhood or headend store 148, 144 remote to the user that is streaming the program to the user rather than having the program stored locally in a program store 208 of a DVR or set top box 120. A dedicated channel is used to supply the program to the user with MPEG-2 transport, for example. Other embodiments could use packet switched transport over a network to deliver the program. The remote server formulates the programs for playback and receives temporal manipulation commands from the user. The temporal manipulation may or may not be allowed by the remote server based, at least in part, on the position of playback in the program and the advertising options of the user.

Figure 20:
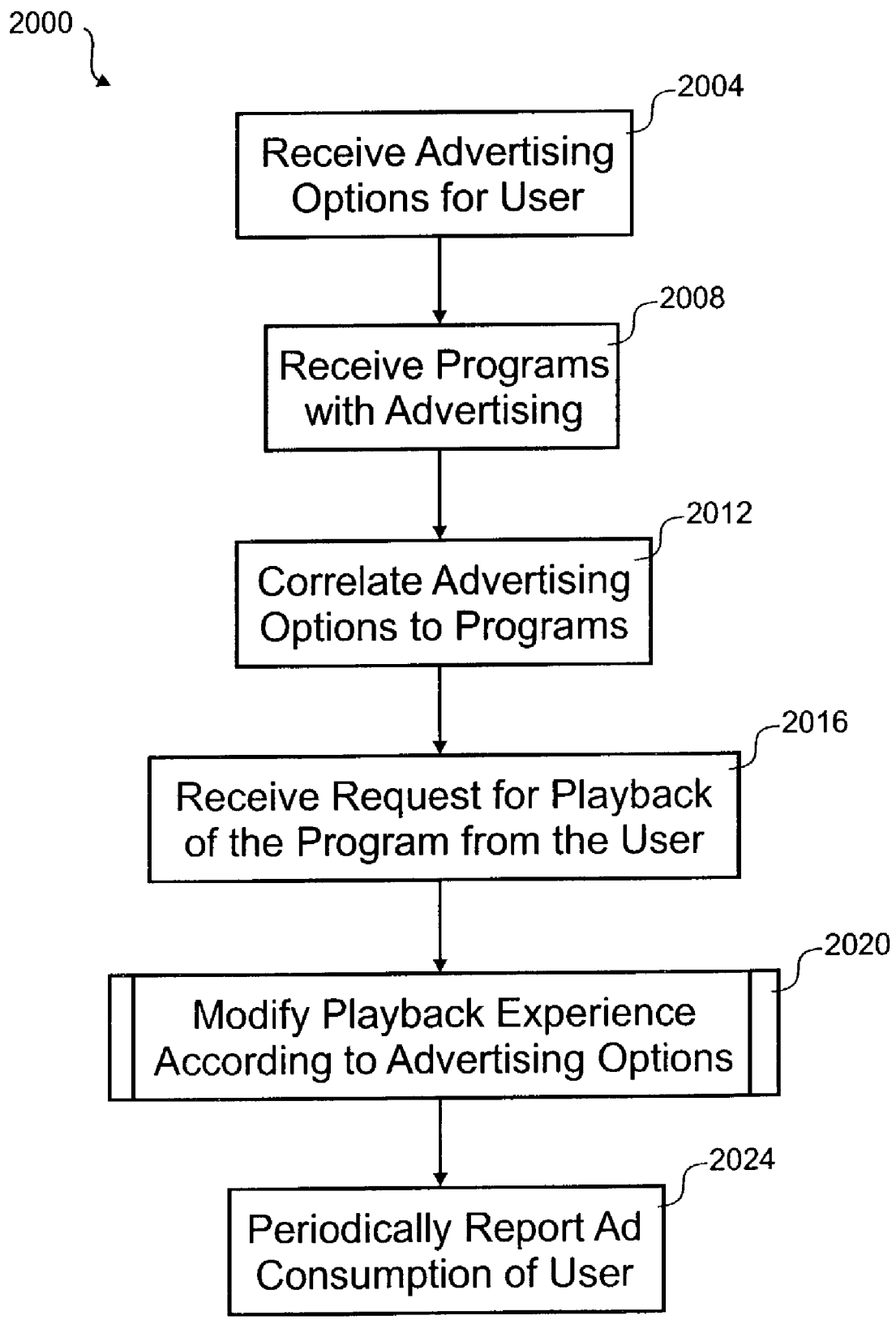
FIG. 20 is a flow diagram of an embodiment of a process for implementing the curtailment of advertising.

With reference to FIG. 20, a flow diagram of an embodiment of a process 2000 for implementing the curtailment of advertising is shown. The advertising options are received by a STB 120 in step 2004. FVOD or linearly scheduled programs are received in step 2008. In some embodiments, the FVOD programs are downloaded from a network or could be recorded from the linear schedule. The advertising options, which could be global or unique to a particular program or class or programs, are correlated to the programs in step 2012.

In step 2016, the user can request playback of a program that the advertising options apply to. In step 2020, the playback experience is modified by the STB 120 according to the advertising options. Other embodiments could modify the playback experience remote to the user location. Interaction with the commercials is monitored during playback. That interaction is reported back to the headend in step 2024. Monitoring interaction allows for accounting monetary costs and/or monetary credits and allows determining viewership rates for a commercial.

Figure 21A:
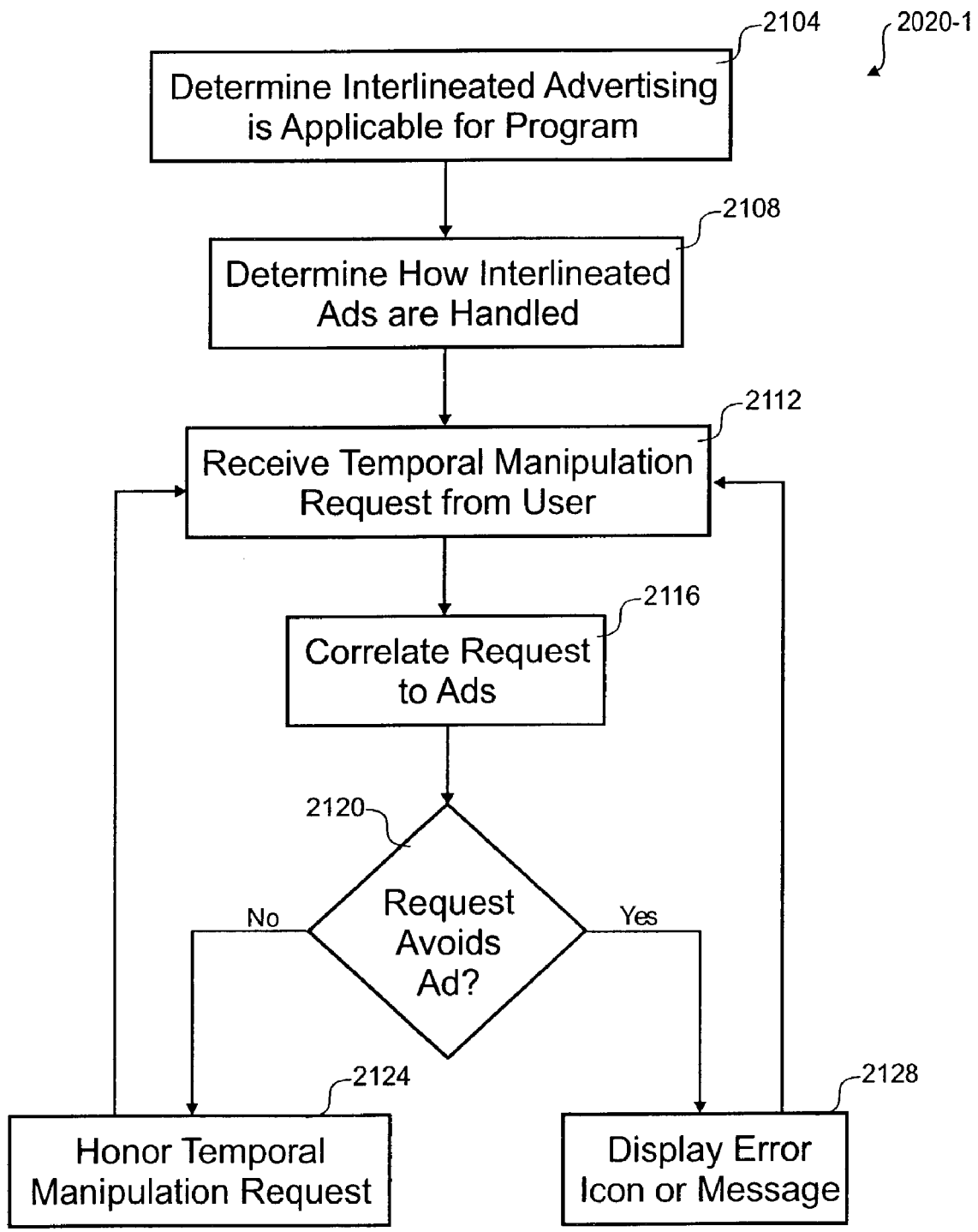
FIG. 21A is a flow diagram of an embodiment of a process for playing a program with interlineated commercials.

Referring next to FIG. 21A, a flow diagram of an embodiment of a process 2020-1 for playing a program with interlineated commercials is shown. In steps 2104 and 2108, a determination is made that the program being played back has interlineated commercials that must be watched. The user may be given the ability to fast forward or rewind through large portions of the program and any commercial breaks to move to a different portion of the playback. The ability to manipulate playback could be disabled or crippled when a program is playing and a commercial break is approaching. This crippling would prevent the user from avoiding the commercial break from playing in the normal manner. Some embodiments could also prevent the television volume or mute functions on the television from being altered during the commercial break.

Whenever a temporal manipulation is received such as in step 2112, the STB 120 determines if it is allowed. The request is correlated to the commercials that will be encountered in light of the temporal manipulation in step 2112. For example, when approaching a commercial break or during a commercial break a rewind manipulation is to be treated differently from a fast-forward manipulation. The rewind is allowed, but the fast-forward is not in this embodiment. A determination is made in step 2120 to see if the manipulation is to avoid a required segment such as a commercial, cross-promotion menu, credit or warning.

Where avoidance is not determined to be the purpose of the manipulation, it is allowed in step 2124. If avoidance is presumed to be the purpose of the manipulation, an error icon or message is displayed on the screen in step 2128. Other embodiments could cause an error tone when not allowed or the STB 120 could simply ignore the command. Some embodiments could allow the user to avoid these lockouts by paying a fee or applying credits.

Figure 21B:
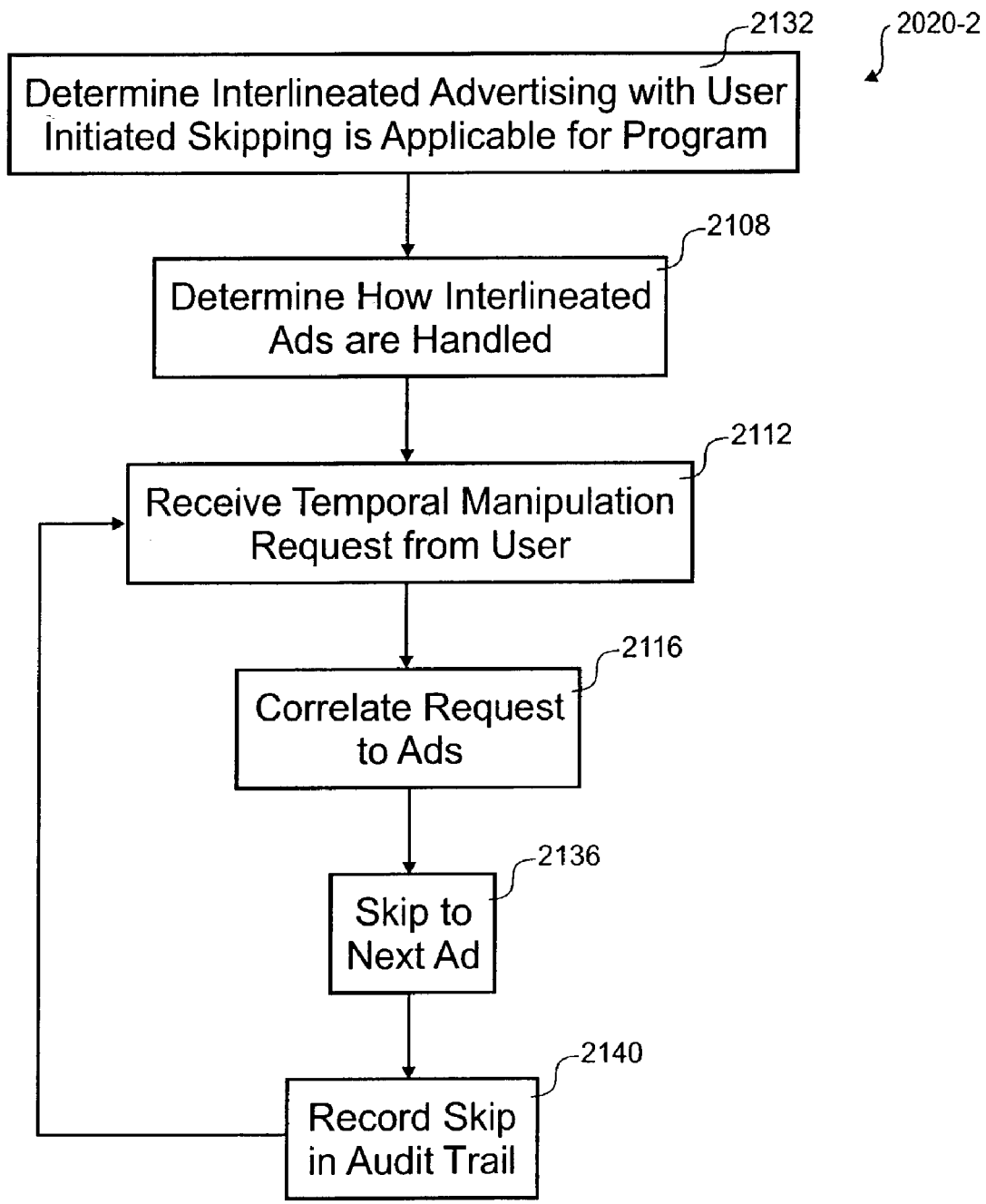
FIG. 21B is a flow diagram of an embodiment of a process for playing a program with interlineated commercials that can be individually skipped.

With reference to FIG. 21B, a flow diagram of an embodiment of a process 2020-2 for playing a program with interlineated commercials is shown where those commercials can be individually skipped. In this embodiment, single commercials can be skipped upon recognizing operation in this mode by the set top box 120 in step 2132. Some embodiments may only allow a subset of the commercials to be skipped or a number of the commercials in the program to be skipped. For example, alcohol commercials could be skipped or half of the commercials could be skipped in the program. When the user fast-forwards or asks to skip a commercial in step 2136, playback fast-forwards or skips to the next commercial. For example, avoiding five commercials in a commercial break entails pressing the skip button on the remote five times. There could be embodiments that allow skipping multiple commercials at one time. In step 2140, avoidance of a commercial is recorded in the audit trail.

The user could be charged a fixed or variable amount for each commercial skipped or could pay a flat fee for unlimited commercial skipping. Conversely, the user could be paid a fixed or variable amount to not skip a commercial. A point system of credits and debits could be used in some embodiments. The bonus or cost for a commercial could be indicated by an icon. For example, a 2.5 point commercial could be denoted by two and a half dollar-sign icons. A user may get 1,000 or some other amount of skip credit points for a month based upon their service subscription. The amount of credit points would be reduced as the user skips commercials. The user could set thresholds, such as skip all or only allow skipping of commercials that cost less than a threshold like 5 credits.

Some embodiments could monitor presence of the user during playback or skipping of a commercial. A video detector or infra-red sensor could be used to determine if one or more users are present when a commercial is being played or skipped. Credits or debits could be charged per capita or charged to specific users. For example, skipping a commercial would only cost a credit point(s) when the preceding or following portions of the program had a user watching those portions. The users of the set top box 120 could have separate accounts for points or charges such that credits and debits are assigned individually. Face recognition of users could be performed with the video detector. In some cases, credits or debits could be spread among the viewing users. For example, a commercial that cost 2.5 credit points to skip could be divided among the five viewers such that each only paid a half credit point. Similarly, credits for viewing programs could be multiplied for the number of users viewing the commercial.

Figure 21C:
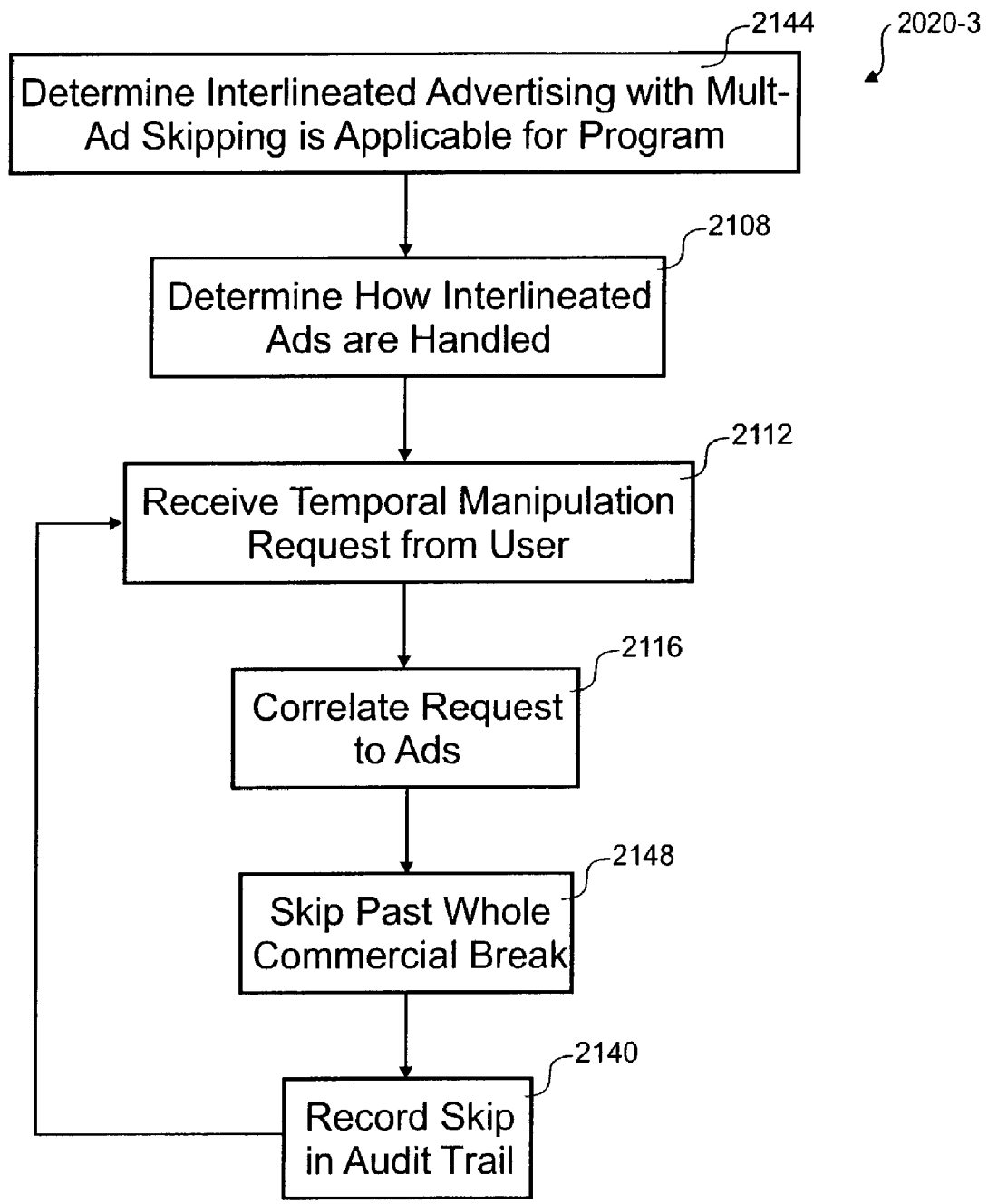
FIG. 21C is a flow diagram of an embodiment of a process for playing a program with interlineated commercial breaks that can be selectively skipped.

Referring next to FIG. 21C, a flow diagram of an embodiment of a process 2020-3 for playing a program with interlineated commercial breaks is shown that allows skipping of a whole commercial break. A commercial break, the credits and/or a warning, wherever it appears in the program, can be skipped or fast-forwarded through in this embodiment when that mode is detected in step 2144. For example, pressing the skip button on the remote during a commercial break including a number of commercials in step 2148 will skip past all those commercials and begin playback of the program immediately after those commercials. Debits or cost for skipping could be accumulated for the whole commercial break. Some embodiments could skip portions of the commercial break and require playback of other portions.

Figure 21D:
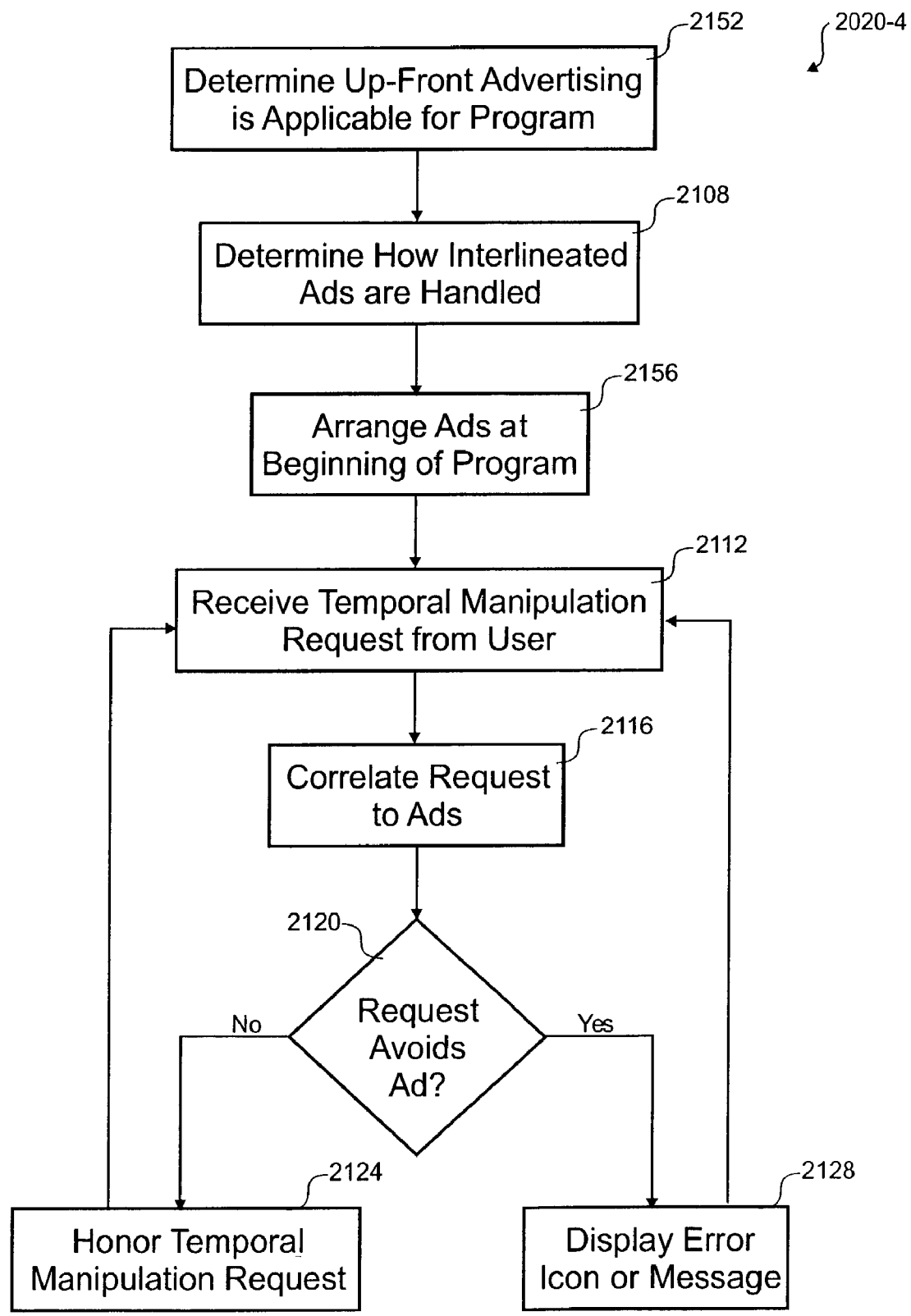
FIG. 21D is a flow diagram of an embodiment of a process for playing a program with up-front commercials that cannot be skipped.

With reference to FIG. 21D, a flow diagram of an embodiment of a process 2020-4 for playing a program with up-front commercials is shown where those commercials cannot be skipped. In this embodiment, the commercials are arranged at the beginning of the program. A determination is made in step 2152 that up-front commercials are to be used without the ability to skip them. Customized commercials or those interlineated in the program are arranged for playback at the beginning of the program in step 2156. For example, a program could have commercial breaks in the program. By knowing where those breaks are, the commercials can be played whenever the user starts playback of the program. This could be done irrespective of whether the user begins playback from the beginning of the program. Any attempt to skip these commercials is ignored in this embodiment.

Other embodiments could move the commercials to the start of viewing but allow skipping of one or more commercials or allow fast-forwarding through the commercials. Some embodiments could allow certain speeds of fast-forward, but not others. For example, a 2× fast-forward would be allowed but any faster speeds would not be allowed during some or all commercials. Some of the commercials could be customized for the user, for example, cross-promotion menus.

Figure 21E:
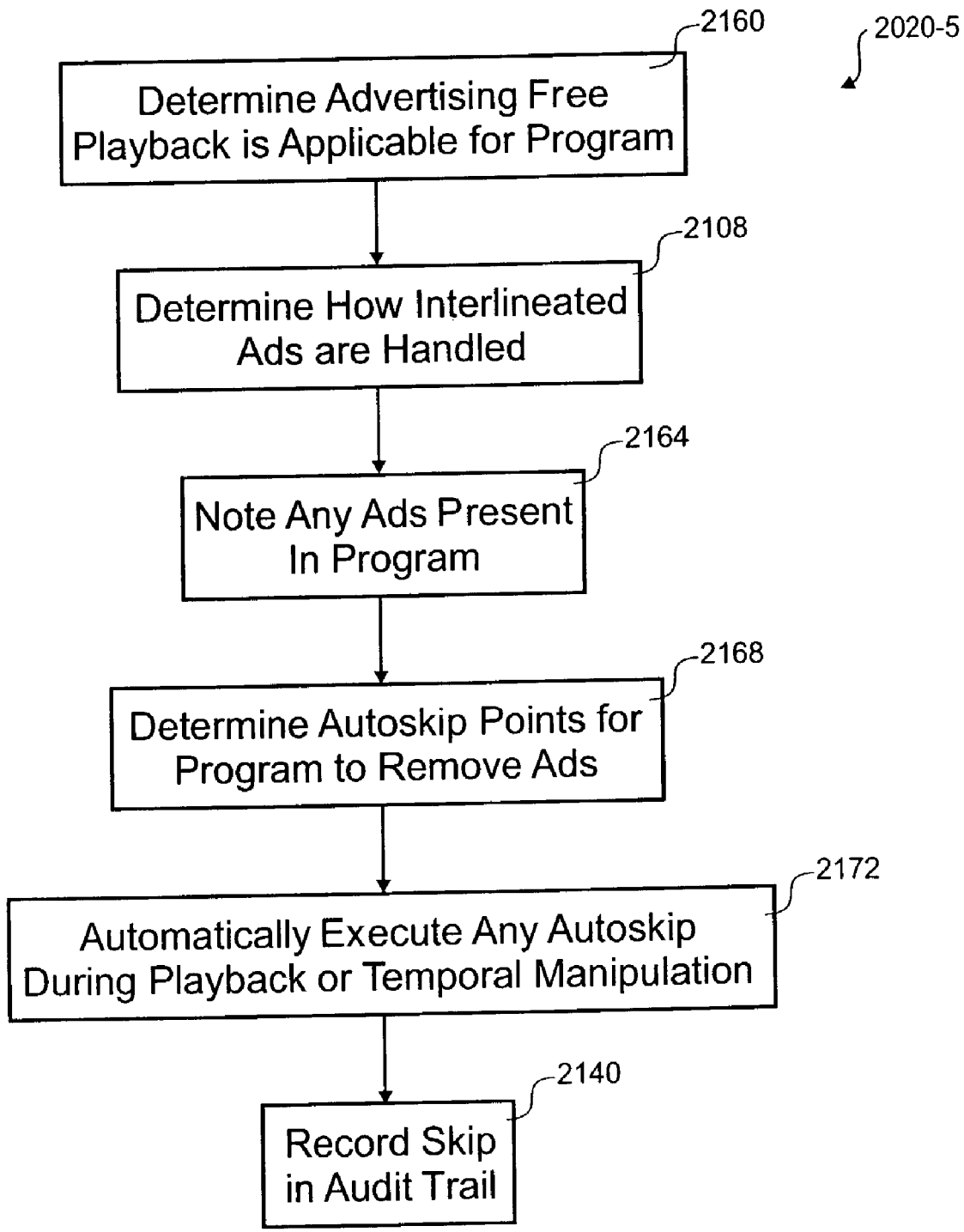
FIG. 21E is a flow diagram of an embodiment of a process for playing a program with commercials that are automatically removed from the program.

Referring next to FIG. 21E, a flow diagram of an embodiment of a process 2020-5 for playing a program with commercials is shown where the commercials are automatically removed from the program playback. The commercials in a program could be at the beginning, end or throughout. This embodiment seamlessly removes those commercials so playback appears commercial free. Some embodiments could only remove the commercials during fast-forward or rewind, but not during playback. In step 2160, it is determined that the program should play commercial free. The position of commercials is noted in step 2164. Autoskip commands are formulated in step 2168. When playback reaches any of these autoskip commands the playback skips to over the commercials in step 2172. Various embodiments could also allow total or selective removal of any windowed commercials that appear on a portion of the screen.

Figure 21F:
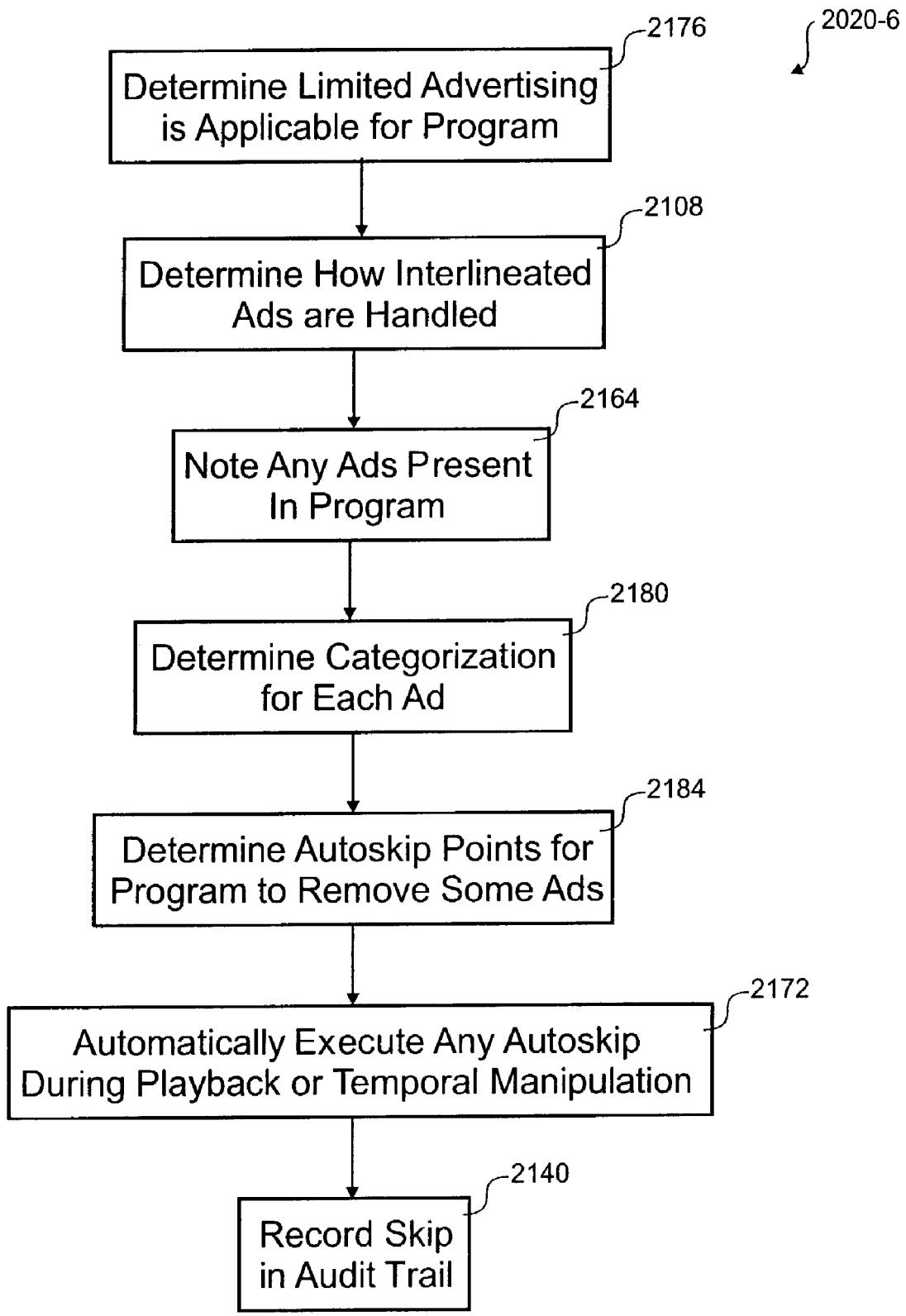
FIG. 21F is a flow diagram of an embodiment of a process for playing a program with commercial subsets that are automatically removed from the program.

With reference to FIG. 21F, a flow diagram of an embodiment of a process 2020-6 for playing a program is shown with automatic removal of commercial subsets from the program. In step 2176, it is determined that automatic skipping for some commercials is available in this mode. The commercials in the program are correlated to the categories allowed or not-allowed in step 2180. Autoskip commands are formulated to skip only those commercials that should be excluded in step 2184. During playback or temporal manipulation, some commercials are played while others are not. In some of the embodiments of commercial manipulation, the user can dis-able the features for a particular program to override the default handling. Where advertising is removed a debit could be applied, or where advertising is added a credit could be applied.

The categories of commercials may be skipped for any number of reasons by the user. For example, commercial related to alcohol, cigarettes, cars, travel, men, women, kids, adults, etc. could be blocked by the user. The user could specify interests such that alternative commercials could be chosen for the user or those commercials could be removed without replacement. Instead of specifying interests, the user could simply op-into various categories of commercials. Alternative commercials could be stored for to splice in the alternative at the appropriate time. The preference database 160 could hold the skip categories and interests for each user.

Some embodiments could allow a user to express interest in a commercial. The user could rank interest in particular commercials to allow more clearly defining the preferences of a user. Further, the user could ask for more information on a particular commercial. By that indication, additional information could be retrieved at that time or later sent by mail, e-mail and/or telephone. The commercials found of interest could affect the profile for that user in the preference database 160.

A number of variations and modifications of the invention can also be used. In different embodiments, the programs sent to the users could be video or audio programs. Commercials could be skipped, rearranged and/or removed from those audio programs in a similar manner. The various embodiments described above use satellite and cable links to receive programs, however packet switched networks such as the Internet could also be used. Further, wireless, telephone or power line content distribution using digital or analog signals could also be used in addition to other broadband distribution techniques. Additionally, the control data channel to a set top box could also use the Internet to communicate between the set top box and headend or neighborhood node.

While the principles of the invention have been described above in connection with specific apparatuses and methods, it is to be clearly understood that this description is made only by way of example and not as limitation on the scope of the invention.

What is claimed is:

1. A method for playing a video program for a user that has an associated commercial that can be avoided to some extent if the user is authorized, the method comprising:
   receiving the video program;
   providing the video program for display with a video player;
   receiving control information for the associated commercial, wherein:
      the control information indicates a portion of the video program that contains the associated commercial, and
      the control information is at least partially encrypted;
   detecting a request from the user to temporally manipulate playback of the video program, wherein the request to temporally manipulate playback comprises at least one of a request to fast forward or a request to skip forward in the video program;
   determining a playback point in the video program for the associated commercial;
   correlating the request to temporally manipulate playback to the portion of the video program containing the associated commercial;
   determining if the user is authorized to avoid normal playback of the associated commercial;
   temporally manipulating the playback of the video program according to the request to temporally manipulate playback for portions of the video program not indicated by the control information to be the associated commercial; and stopping temporally manipulating the playback of the video program upon reaching the portion of the video program indicated by the control information to be the associated commercial and beginning normal playback of the video program if the user is not authorized to avoid normal playback of the associated commercial.

2. The method for playing the video program for the user that has the associated commercial that can be avoided to some extent if the user is authorized as recited in claim 1, wherein the receiving and providing are at least partially coincident.

3. The method for playing the video program for the user that has the associated commercial that can be avoided to some extent if the user is authorized as recited in claim 1, further comprising auditing interaction of the user with the associated commercial.

4. The method for playing the video program for the user that has the associated commercial that can be avoided to some extent if the user is authorized as recited in claim 3, further comprising reporting the interaction away from a user location.

5. The method for playing the video program for the user that has the associated commercial that can be avoided to some extent if the user is authorized as recited in claim 1, wherein, if the user is authorized to avoid normal playback of the associated commercial, the method further comprises curtailing advertisement chosen from a group consisting of:
removal of all advertising,
removal of certain classes of advertising,
removal of ads for certain products,
removal of superimposed commercials,
removal of interlineated commercials during the video program,
removal of commercials during temporal manipulation,
removal of commercials at a beginning of the video program,
removal of commercials at an end of the video program,
removal of cross-promotion menus,
allowing skipping of a single commercial,
allowing skipping of a whole commercial break,
allowing some or all temporal manipulation commands during a commercial,
allowing or preventing targeted advertising customized for the user,
allowing the opening or closing credits of a video program to be skipped or temporally manipulated, or
allowing removal of some or all windowed commercials.

6. The method for playing the video program for the user that has the associated commercial that can be avoided to some extent if the user is authorized as recited in claim 1, further comprising removing a plurality of commercials from the normal playback.

7. A computer-readable medium having computer-executable instructions for performing the computer-implementable method for playing the video program for the user that has the associated commercial that can be avoided to some extent if the user is authorized of claim 1.

8. A computer system adapted to perform the computer-implementable method for playing the video program for the user that has the associated commercial that can be avoided to some extent if the user is authorized of claim 1.

9. A method for providing a video program to a user for playback with a content delivery system having multiple video programming channels available simultaneously, the method comprising:

receiving a video program electronically from a point remote to where playback is performed;

storing the video program in a compressed digital format with a video player;

identifying a plurality of portions of the video program, the plurality of portions comprising commercials;

determining advertising options applicable to the video program;

playing the video program with the advertising options applied; and modifying how a temporal manipulation of playback is acted upon during playback of the plurality of portions containing commercials, wherein the modifying step includes a step of performing the temporal manipulation of the playback of the video program for portions of the video program not containing commercials until one of the plurality of portions containing commercials is reached, wherein:

the temporal manipulation of the video program is deactivated to transition to normal playback for the one of the plurality of portions containing the advertisement if the user is not authorized to avoid normal playback, and the temporal manipulation that is deactivated comprises at least one of a fast forward or a skip forward.

10. The method for providing the video program to the user for playback as recited in claim 9, further comprising:
determining audit information indicative of the modifying; and
accounting for credits and debits corresponding to the audit information.

11. The method for providing the video program to the user for playback as recited in claim 9, wherein the modifying comprises:
ignoring the temporal manipulation if a particular portion does not belong to a predetermined category of portions.

12. The method for providing the video program to the user for playback as recited in claim 9, wherein the plurality of portions further comprise portions chosen from a group consisting of credits, warning messages, and previews.

13. The method for providing the video program to the user for playback as recited in claim 9, further comprising:
retrieving information on the user;
modifying one of the plurality of portions in a manner consistent with the information.

14. The method for providing the video program to the user for playback as recited in claim 9, wherein the storing is performed remote to a location of the user.

15. The method for providing the video program to the user for playback as recited in claim 9, further comprising receiving control information for the video program, wherein:
the control information indicates placement of the plurality of portions in the video program, and
the control information is at least partially encrypted.

16. The method for playing the video program for the user that has the associated commercial that can be avoided to some extent if the user is authorized as recited in claim 1, further comprising displaying a message or icon for the user that is correlated in time with the stopping.

17. The method for providing the video program to the user for playback as recited in claim 9, further comprising determining if the temporal manipulation is a reverse playback function, wherein the modifying comprises honoring the temporal manipulation if the temporal manipulation is the reverse play back function.

* * * * *